(12) United States Patent  
Shimura et al.

(10) Patent No.: US 8,583,940 B2  
(45) Date of Patent: Nov. 12, 2013

(54) ELECTRONIC CAMERA, STORAGE MEDIUM, AND DATA TRANSFER METHOD

(75) Inventors: Kazuhiko Shimura, Hachioji (JP); Toshiaki Wada, Tama (JP); Tsuyoshi Yaji, Kawagoe (JP)

(73) Assignee: Olympus Imaging Corp., Tokyo (JP)

( * ) Notice: Subject to any disclaimer, the term of this patent is extended or adjusted under 35 U.S.C. 154(b) by 360 days.

(21) Appl. No.: 12/740,988

(22) PCT Filed: Oct. 29, 2008

(86) PCT No.: PCT/JP2008/070146  
§ 371 (c)(1),  
(2), (4) Date: Apr. 30, 2010

(87) PCT Pub. No.: WO2009/057806  
PCT Pub. Date: May 7, 2009

(65) Prior Publication Data  
US 2010/0251390 A1   Sep. 30, 2010

(30) Foreign Application Priority Data  
Nov. 1, 2007  (JP) ................................ P2007-285029

(51) Int. Cl.  
*H04L 29/00* (2006.01)  
(52) U.S. Cl.  
USPC ............................ 713/193; 711/163; 711/164  
(58) Field of Classification Search  
USPC ......................................................... 713/193  
See application file for complete search history.

(56) References Cited

U.S. PATENT DOCUMENTS

| 6,529,992 | B1 | 3/2003 | Thomas et al. |
| 6,778,974 | B2 | 8/2004 | Moore et al. |
| 6,857,032 | B2 | 2/2005 | Koshikawa et al. |
| 2002/0069237 | A1* | 6/2002 | Ehara ............................ 709/200 |
| 2002/0118837 | A1* | 8/2002 | Hamilton ...................... 380/277 |
| 2003/0174167 | A1 | 9/2003 | Poo et al. |
| 2004/0153648 | A1* | 8/2004 | Rotholtz et al. .............. 713/176 |

(Continued)

FOREIGN PATENT DOCUMENTS

| EP | 0 667 622 | 8/1995 |
| EP | 1 715 403 | 10/2006 |

(Continued)

OTHER PUBLICATIONS

Extended European Search Report for European Patent Application No. 08846162.9-2202, mailed Jun. 27, 2011 (6 pgs.).

(Continued)

*Primary Examiner* — Ghazal Shehni  
(74) *Attorney, Agent, or Firm* — John C. Pokotylo; Straub & Pokotylo

(57) ABSTRACT

Image data obtained by photographing an object using a camera is stored in a storage medium that can be attached to and detached from the camera. The camera includes a device program storage unit and an information writing unit. A device program that can be executed by an information processing device, which is different to the camera, is stored in the device program storage unit. The information writing unit is constituted to be capable of writing the device program to the storage medium attached to the camera. While writing the device program to the storage medium, the information writing unit writes the device program in a format enabling the information processing device to read and execute the device program automatically when the storage medium is attached to the information processing device.

14 Claims, 17 Drawing Sheets

(56) References Cited

U.S. PATENT DOCUMENTS

| | | |
|---|---|---|
| 2006/0173918 A1 | 8/2006 | Nakase et al. |
| 2006/0242262 A1 | 10/2006 | Riegler et al. |
| 2008/0043116 A1 | 2/2008 | Lappi et al. |

FOREIGN PATENT DOCUMENTS

| | | |
|---|---|---|
| JP | 10-164490 | 6/1998 |
| JP | 2001-142568 | 5/2001 |
| JP | 2002-232819 | 8/2002 |
| JP | 2004-151785 | 5/2004 |
| JP | 2005-167641 | 6/2005 |
| JP | 2006-227822 | 8/2006 |
| JP | 2006-331410 | 12/2006 |
| WO | WO 02/08927 | 1/2002 |
| WO | WO 2006/013231 | 2/2006 |

OTHER PUBLICATIONS

PCT/ISA/220, "Notification of Transmittal of the International Search Report and the Written Opinion of the International Searching Authority, or the Declaration" for PCT/JP2008/070146 (in Japanese) (4 pgs.).

PCT/ISA/210, "International Search Report" for PCT/JP2008/070146 (5 pgs.) with translation (4 pgs.).

PCT/ISA/237, "Written Opinion of the International Searching Authority" for PCT/JP2008/070146 (in Japanese) (5 pgs.).

\* cited by examiner

ELECTRONIC CAMERA, STORAGE MEDIUM, AND DATA TRANSFER METHOD

TECHNICAL FIELD OF THE INVENTION

This invention relates to an electronic camera, a storage medium such as a memory card that can be attached to the electronic camera, and a data transfer method.

BACKGROUND OF THE INVENTION

When a digital still camera or a digital movie camera (hereafter, these camera will be referred to simply as a "digital camera") is sold, a CD-ROM or the like is often included. Utility software, an electronic manual, driver software, an HTML file and so on are stored on the CD-ROM. The utility software is used to transfer image data files obtained during image capturing using the digital camera to an information processing device such as a personal computer (hereafter, the personal computer will be referred to as a "PC") so that the image data files can be viewed, retouched, printed on a printer, and so on. The electronic manual allows handling procedures and the like for the electronic camera to be viewed on a display of the PC. The driver software allows image data and the like to be exchanged between the electronic camera and the PC when the electronic camera is connected to the PC via a USB cable or the like. The HTML file is used to activate Internet viewing software (a browser) and guide a user to a user registration website of the camera vendor or the like such that when user registration is complete, the user can obtain support information from the camera vendor, view pages of a website that can only be accessed by the user, and receive services provided by the camera vendor.

SUMMARY OF THE INVENTION

Recent PCs often include a memory card slot, and by inserting a memory card removed from the electronic camera into the memory card slot, image data can be transferred to the PC. Even with a PC that does not have a memory card slot, image data can be transferred to the PC by connecting the memory card to the PC via a USB-connectable memory card reader. Furthermore, with the recent popularization of electronic cameras, electronic camera users often already own software for viewing, retouching, and printing images and do not therefore put the utility software provided by the camera vendor to use. As a result, the CD-ROM included with the electronic camera is sometimes tucked away without even being unwrapped, and user registration, which can be performed easily simply by opening the HTML file or the like stored on the CD-ROM, is not performed. When user registration is not performed, it is impossible to inform the user directly of available version upgrades of the utility software and version upgrades of firmware incorporated into the electronic camera main body, and thus the camera vendor may be unable to provide an unregistered user with the latest information, software, and firmware.

This invention has been designed in consideration of the problem described above, and it is an object thereof to enable a user to perform user registration easily without the use of a CD-ROM or the like included with an electronic camera, to make it possible to provide the user with the latest software, firmware and so on, and to enable an application program to be executed on a PC without requiring the user to perform a troublesome installation operation.

(1) A first aspect of this invention is applied to a camera constituted to be capable of storing image data obtained by photographing an object in a detachable storage medium. The camera solves the problems described above by comprising: a device program storage unit in which at least one device program that can be executed by a different information processing device to the camera is stored; and an information writing unit that writes the device program to the storage medium attached to the camera, wherein the information writing unit writes the device program to the storage medium in a format enabling the information processing device to read and execute the device program automatically when the storage medium is attached to the information processing device.

According to this aspect of the invention, a camera constituted to be capable of storing image data obtained by photographing an object in a detachable storage medium includes a device program storage unit in which at least one device program that can be executed by a different information processing device to the camera is stored. The camera includes an information writing unit that writes the device program stored in the device program storage unit to the storage medium attached to the camera. Here, the information writing unit writes the device program to the storage medium in a format enabling the information processing device to read and execute the device program automatically when the storage medium is attached to the information processing device. Thus, a user of the camera can use the device program, which is executed automatically by the information processing device, without performing an operation to install the device program.

(2) A second aspect of this invention is applied to a storage medium that can be attached to and detached from an information processing device. The storage medium solves the problems described above by storing a first device program stored in a format enabling automatic reading and activation thereof by the information processing device when the storage medium is attached to the information processing device, and a second device program which is different to the first device program, wherein processing to read and activate the second device program is included as processing performed when the first device program is executed by the information processing device, the information processing device includes reading data stored in the storage medium in addition to the first device program and the second device program from the storage medium and executing predetermined processing as processing performed when the second device program is executed by the information processing device, and the first device program and the second device program are stored in the storage medium by a camera which is different to the information processing device when the storage medium is attached to the camera.

According to this aspect of the invention, first and second device programs that can be executed by the information processing device (a personal computer, for example) are stored in the camera, and these device programs are stored in the storage medium by the camera when the storage medium is attached to the camera. When the storage medium is attached to the information processing device, the first device program is stored in a format enabling the information processing device to read and execute the first device program automatically. Further, when the first device program is executed by the information processing device, the second device program is read and executed, and when the second device program is executed by the information processing device, data stored in the storage medium in addition to the first device program and second device program are read from the storage medium and predetermined processing is executed. Thus, the user of the camera can use the device program, which is executed automatically by the information processing device, without performing an operation to install the device program.

(3) A third aspect of this invention is applied to a data transfer method executed by a system constituted by a camera, an information processing device, and a storage medium that can be attached to the camera and the information processing device.

The data transfer method comprises: a first storage step for storing a device program that is executed by the information processing device and first data that are different to the device program, the device program and the first data being stored in the camera, in the storage medium attached to the camera;

a first detection step for detecting attachment of the storage medium when the storage medium is attached to the information processing device;

a device program activation step for activating the device program stored in the storage medium attached to the information processing device when attachment of the storage medium is detected in the first detection step; and a control step for controlling the information processing device to read the first data from the storage medium attached to the information processing device in accordance with the device program activated in the activation step, and execute predetermined processing.

Embodiments and advantages of this invention will be described in detail below with reference to the attached figures.

DESCRIPTION OF THE PREFERRED EMBODIMENTS

Figure 1:
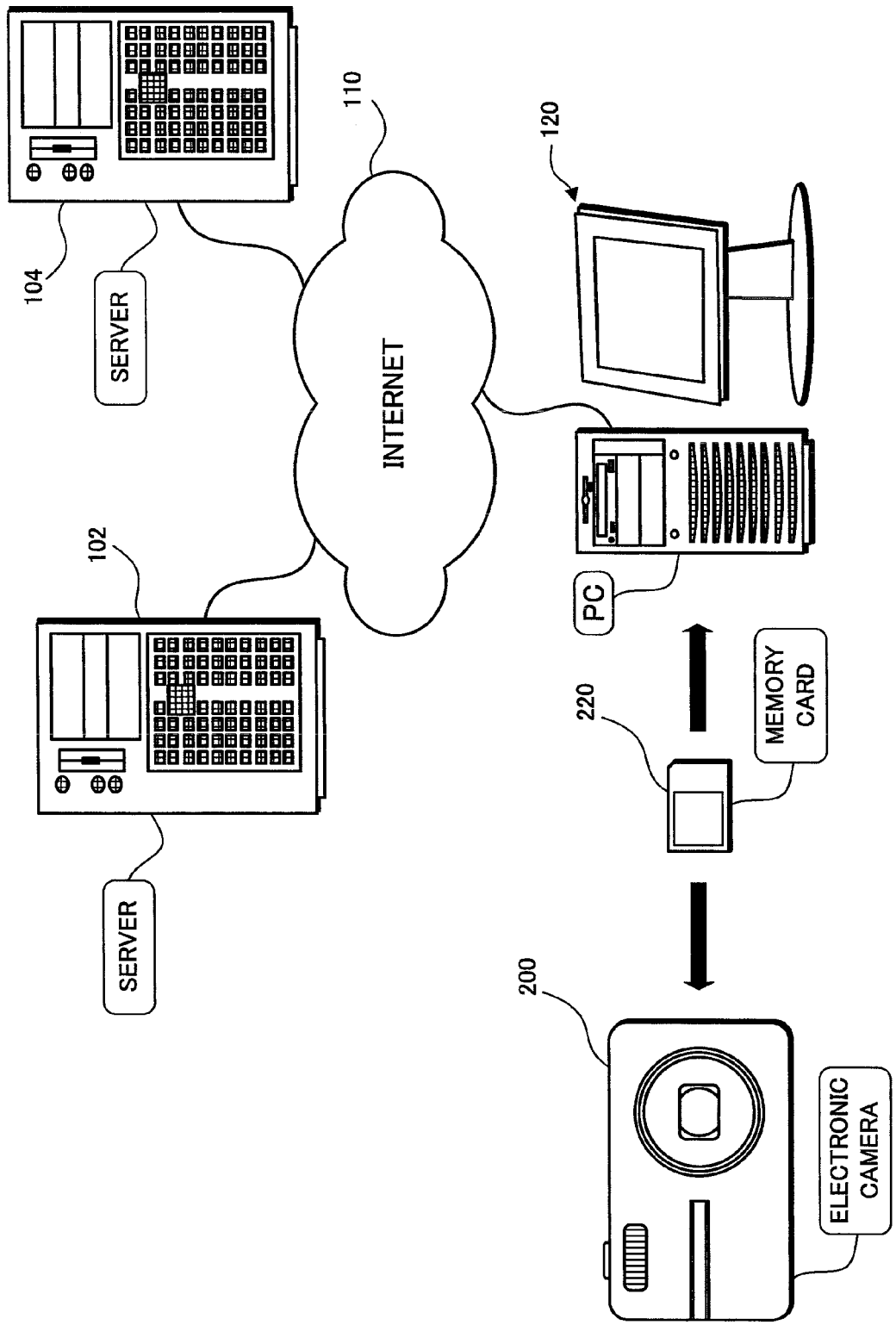
FIG. 1 is a schematic diagram showing the manner in which a memory card that can be attached to a battery camera can also be attached to a PC that can be connected to an application server via the Internet.

FIG. 1 shows an electronic camera 200 and a memory card (storage medium) 220 according to an embodiment of this invention. The memory card 220 can be attached to the electronic camera 200, and is capable of storing data files relating to images captured by the electronic camera 200, other data files, program files, and so on. By removing the memory card 220 from the electronic camera 200 and inserting it into a memory card slot (not shown) of an information processing device 120 such as a personal computer (hereafter, the information processing device 120 will be referred to simply as PC 120), an image data file can be copied or transferred to an internal auxiliary storage device (a hard disk drive, for example) of the PC 120 from the memory card 220 through processing of a predetermined image reading program executed by the PC 120. The PC 120 is connected to the Internet 110 and is capable of accessing a plurality of servers 102, 104 that are also connected to the Internet 110. Only two servers 102, 104 are shown in FIG. 1, but there is no limit to the number of servers.

Figure 2:
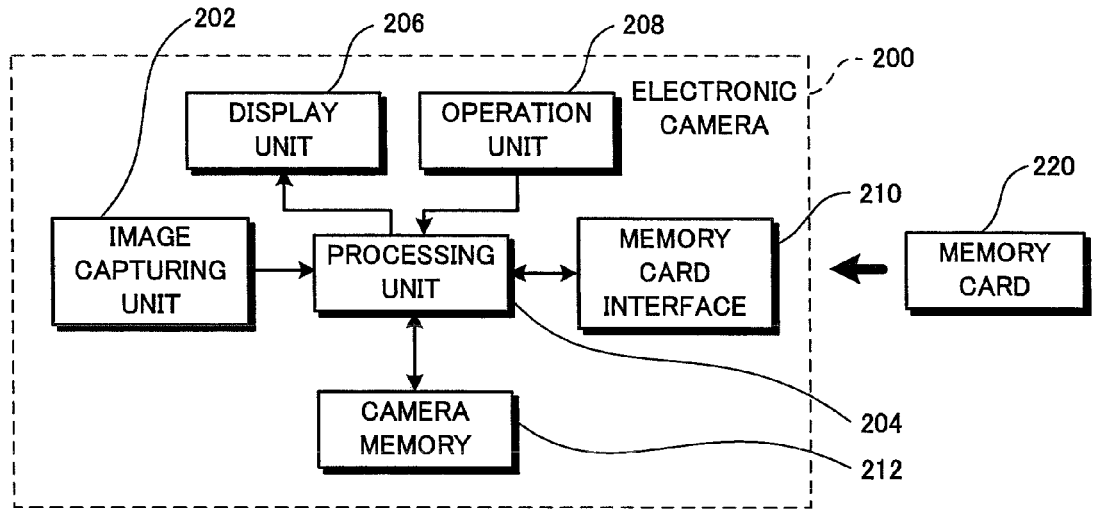
FIG. 2 is a schematic block diagram showing the interior constitution of an electronic camera according to an embodiment of this invention.

FIG. 2 is a schematic block diagram showing the internal constitution of the electronic camera 200. The electronic camera 200 comprises a image capturing unit 202, a processing unit 204, a display unit 206, an operation unit 208, a memory card interface 210, and a camera memory 212. The memory card 220 can be attached to the electronic camera 200 detachably via the memory card interface 210.

The image capturing unit 202 is used to capture an image and output a digital signal to the processing unit 204, and includes an imaging lens, an imaging device, an imaging device driver, a CDS (correlated double sampling) circuit portion, an AGC (auto-gain control) circuit portion, an A/D converter, and so on. The processing unit 204 is constituted by an ASIC (application specific integrated circuit), a processor that executes various types of processing through a program, or similar, and generates digital image data by implementing processing such as demosaicing, white balance, offset correction, tone correction, and the like on the digital signal output from the image capturing unit 202. The processing unit 204 performs data compression processing on the digital image data as necessary, and then stores the digital image data on the memory card 220 as an image data file via the memory card interface 210.

The display unit 206 comprises a TFT liquid crystal display panel, an organic EL display panel, or similar, and is capable of displaying a preview image (through-image) of an object, reproducing/displaying an image obtained through image capturing, and displaying menus, operation guides, and so on when settings such as an operation mode of the electronic camera 200 are changed. The image displayed on the display unit 206 is generated by the processing unit 204. The operation unit 208 includes a release button, a recording/reproduction switch button, various mode setting buttons, a zoom button, and so on, and detects operation input by a photographer and outputs a detection result to the processing unit 204. The processing unit 204 performs overall control of the operations of the electronic camera 200, including switching between a photography mode and a reproduction mode in accordance with the signal output by the operation unit 208, performing zoom-up/down control, automatic focus adjustment control, exposure control and flash charge/light-emitting control in the photography mode, writing or reading image data files, information and so on to/from the memory card 220, and performing image reproduction display in the reproduction mode.

The memory card interface 210 detects that the memory card 220 is attached to the electronic camera 200, and has a function for controlling data writing/reading when the processing unit 204 writes data to the memory card 220 or reads data from the memory card 220.

The camera memory 212 includes a non-volatile flash memory portion and a volatile RAM portion. The flash memory portion stores a camera program (firmware) for controlling the processing unit 204, and is stored with authentication information, to be described in detail below with reference to FIG. 3, an application program and an automatic activation program that are executed by the external information processing device, server address information, and so on. The RAM portion is used as a buffer memory when a digital signal is processed by the processing unit 204 in the manner described above, and as a working memory of the processing unit 204.

The memory card 220 is a memory that can be attached to and detached from the electronic camera 200, and includes a compact flash, SD memory card, an xD picture card, or similar, each of which constituted by flash memory or the like. In addition to image data files obtained when image capturing is performed using the electronic camera 200, authentication information, to be described in detail below with reference to FIG. 4, an application program and an automatic activation program that are executed by the external information processing device, server address information, and so on are stored on the memory card 220 by the electronic camera 200.

Figure 17:
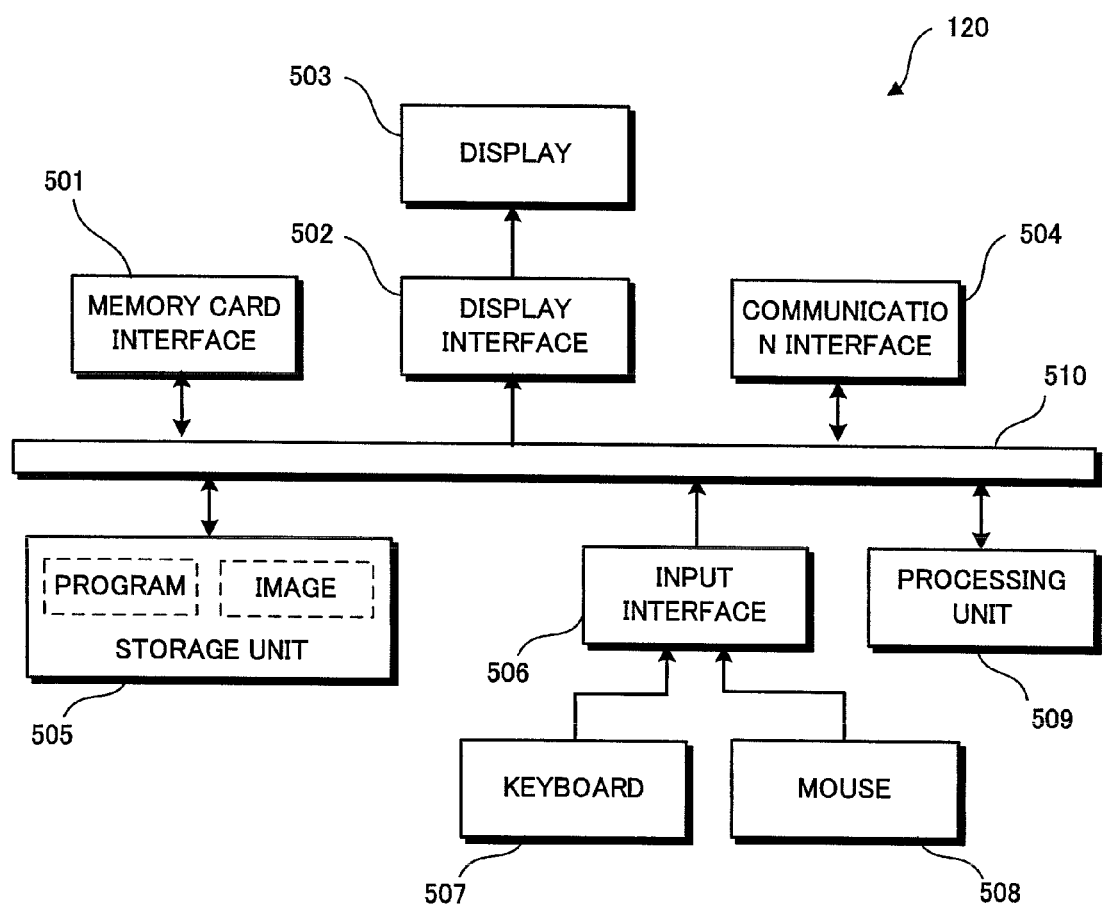
FIG. 17 is a schematic block diagram showing the constitution of the PC (personal computer) according to an embodiment of this invention.

FIG. 17 is a schematic block diagram showing the constitution of the PC 120. Similarly to a typical personal computer, the PC 120 of this embodiment is constituted by an input interface 506 that receives operations performed by a user on a keyboard 507 or with a mouse 508, a storage unit 505 constituted by a storage medium such as a hard disk or a semiconductor memory for storing information such as programs and images, a processing unit 509 that executes the programs stored in the storage unit 505 and processes input information input by the user via the input interface 506 and stored information stored in the storage unit 505 in accordance with the program, a display interface 502 that displays information obtained as a result of the processing performed by the processing unit 509 and the information stored in the storage unit 505 on a display 503, a communication interface 504 that exchanges information with an external device via a communication line, and a system bus 510 for sending information among the various internal units of the PC.

The PC 120 also includes a memory card interface 501 for reading the information stored on the memory card 220 or writing information to the memory card 220 when the memory card 220 storing an image captured by the electronic camera 200 and other information is attached.

Figure 3:
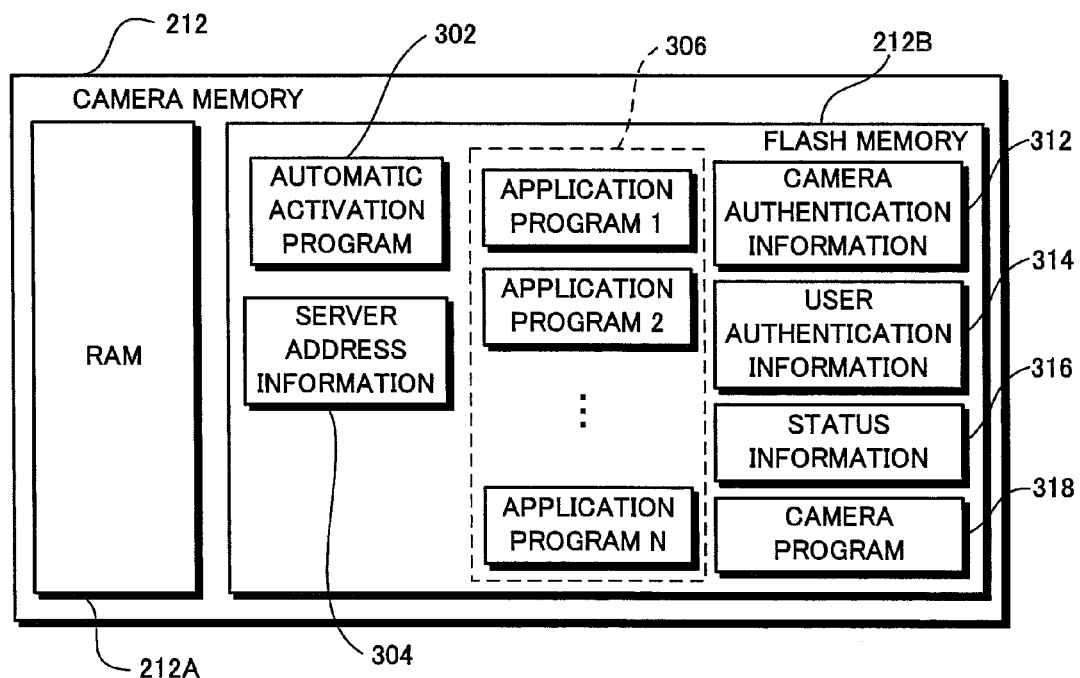
FIG. 3 is a schematic block diagram showing the interior constitution of a camera memory incorporated into the electronic camera.

FIG. 3 is a schematic diagram showing the internal constitution of the camera memory 212. The camera memory 212 includes a RAM portion 212A and a flash memory portion 212B, the RAM portion 212A having the functions described above. A camera program 318, an automatic activation program 302, server address information 304, zero or one or more application programs 1, 2, . . . , N 306 (hereafter, the application programs 1, 2, . . . , N will be referred to simply as application program 306), camera authentication information 312, user authentication information 314, status information 316, and so on are stored in the flash memory portion 212B.

The camera program 318 is a program (firmware) used by the processing unit 204 (FIG. 2) to perform operation control of the electronic camera 200. When a power supply of the electronic camera 200 is switched on, the camera program 318 is copied (loaded) to the RAM portion 212A, and the processing unit 204 gradually reads and executes the program from the RAM portion 212A. The automatic activation program 302 and the application program 306 are not executed by the processing unit 204 of the electronic camera 200 but read to the PC 120 via the memory card 220 and executed by the PC 120, as will be described in detail below.

The server address information 304 includes information relating to an IP address and a URL required when the PC 120 executes the application program 306 to accesses the servers 102, 104 and so on connected to the Internet. The camera authentication information 312 is employed when the user of the electronic camera 200 performs user registration, as will be described below, and includes information with which the model of the electronic camera 200 and the individual electronic camera 200 can be specified. The user authentication information 314 includes information such as a user ID and a password issued by a camera vendor or the like when the user of the electronic camera 200 performs user registration, as will be described below.

The status information 316 is information indicating whether or not the user of the electronic camera 200 has already completed user registration, and includes information indicating whether or not user authentication is required when the application program 306 is executed by the PC to access the servers 102, 104 and so on.

As will be described below with reference to flowcharts, the processing unit 204 copies the automatic activation program 302, the server address information 304 and one or more of the plurality of application programs 306, which are stored in the camera memory 212 as described above, to the memory card 220 when the memory card 220 is detected as being attached to the electronic camera 200. The type of the application program copied at this time is determined by having the user select a desired operation (processing) from a menu screen displayed on the display unit 206 of the electronic camera 200. The processing unit 204 also refers to the status information 316, and if necessary stores the camera authentication information 312 and the user authentication information 314 on the memory card 220.

Figure 4:
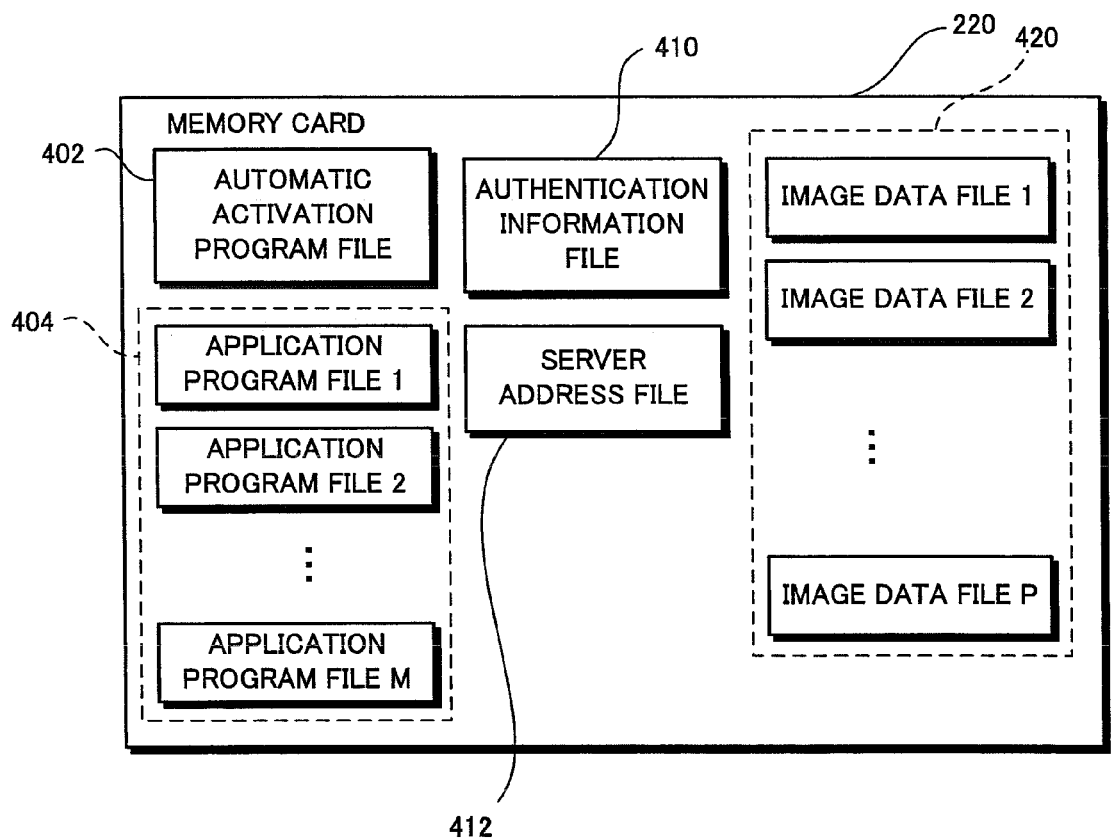
FIG. 4 is a schematic block diagram illustrating files stored on the memory card that can be attached to the electronic camera.

FIG. 4 is a schematic diagram illustrating the content of the memory card 220 after the memory card 220 has been attached to the memory card interface 210 of the electronic camera 200 and a file including the automatic activation program 302, server address information 304, application program 306, camera authentication information 312, user authentication information 314, and so on has been stored thereon from the camera memory 212 by the electronic camera 200 together with an image data file. FIG. 4 shows a state in which application program files 1, M is stored on the memory card 220, M being a natural number of N or less. As described above with reference to FIG. 3, N is the number of application programs stored in the camera memory 212. It should be noted that when only one application program is provided, the application program may be included in an automatic activation program 402. In this case, the application program 306 does not exist in the camera memory 212. Accordingly, the application program is not written to the memory card 220, and therefore only the automatic activation program 402 exists in the memory card 220 and an application program file 404 does not exist.

The program, information and image data described above are stored in a file structure that can be read by the PC 120 when the memory card 220 is attached to the PC 120. Image data files 1, 2, . . . , P 420 (hereafter, the image data files 1, 2, . . . , P will be referred to simply as image data file 420) may be gathered into a single folder.

The automatic activation program file 402 is stored on the memory card 220 in a first predetermined format. Here, the first predetermined format may be any of the following formats, for example. That is, "stored in a first predetermined format" may indicate that the automatic activation program file 402 is stored in a specific directory, for example a root directory, in which directory the PC 120 searches for the automatic activation program when the PC 120 detects that the memory card 220 is attached to the PC 120. Alternatively, the first predetermined format may indicate that the file has a file name or a filename extension that satisfies a requirement for automatic execution by the PC 120. Further, the first predetermined format may indicate a format in which the PC 120 can interpret and execute when the PC 120 read the automatic activation program file 402.

For example, in the Windows operating system of U.S. Microsoft Corporation, a script file entitled "Autorun.inf" may be stored on an optical disk such as a CD-ROM or a DVD-ROM. When it is detected that the optical disk is inserted into an optical disk drive, the Windows operating system searches for the "Autorun.inf" file, and when it finds the file in a root directory of the optical disk, it reads the file automatically, and interprets and executes the script stored in the file. Further, the PC reads an exe-format file specified in the script from the optical disk and executes the file. A program such as "Autorun.inf" is known as an automatic activation program, and is usually stored in a predetermined format having a specific file name or the like.

The application program specified in the automatic activation program is stored in the application program file 404. More specifically, using the Windows system as an example, the file having a name of "Autorun.inf" corresponds to the automatic activation program 402, and the exe-format file specified in the script of "Autorun.inf" corresponds to the application program file 404.

Authentication information needed in cases where authentication is required when the application program 404 is executed by the PC 120 or a server is accessed by the PC 120 via the Internet, or in other words the camera authentication information and the user authentication information, is stored in an authentication information file 410. Information relating to an IP address or a URL of the servers 102, 104 connected to the Internet, which information is required in cases where the servers 102, 104 are accessed when the PC 120 reads and executes the program in the application program file 404, is stored in a server address file 412.

Of the files stored on the memory card 220, the files other than the image data file 420 are stored on the memory card 220 as and when required, and deleted automatically after use. This will be described in detail below.

Figure 5A:
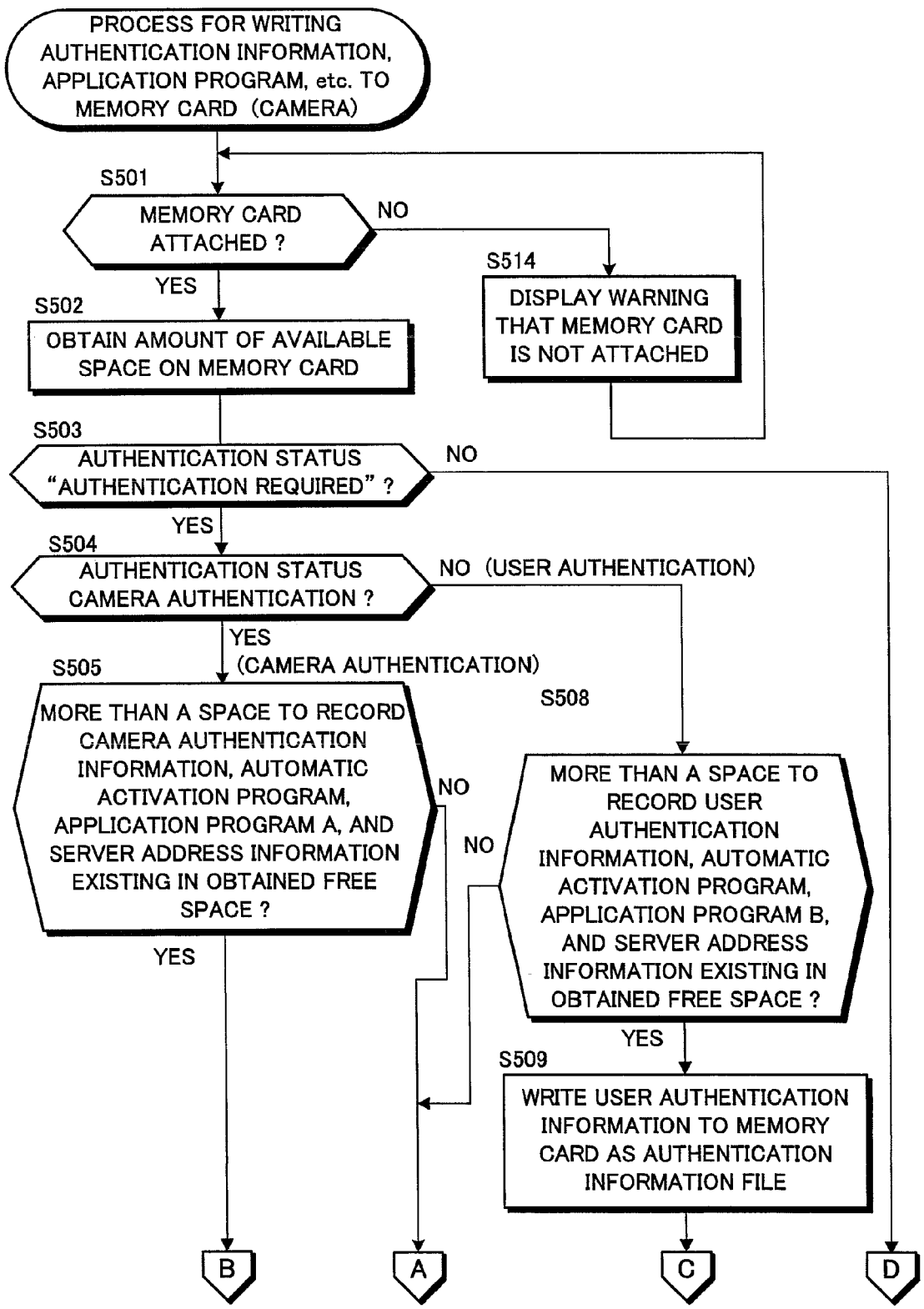
FIG. 5A is a flowchart illustrating a processing procedure for writing authentication information, an application program, and so on to the memory card, which is executed by the electronic camera according to an embodiment of this invention.
Figure 5B:
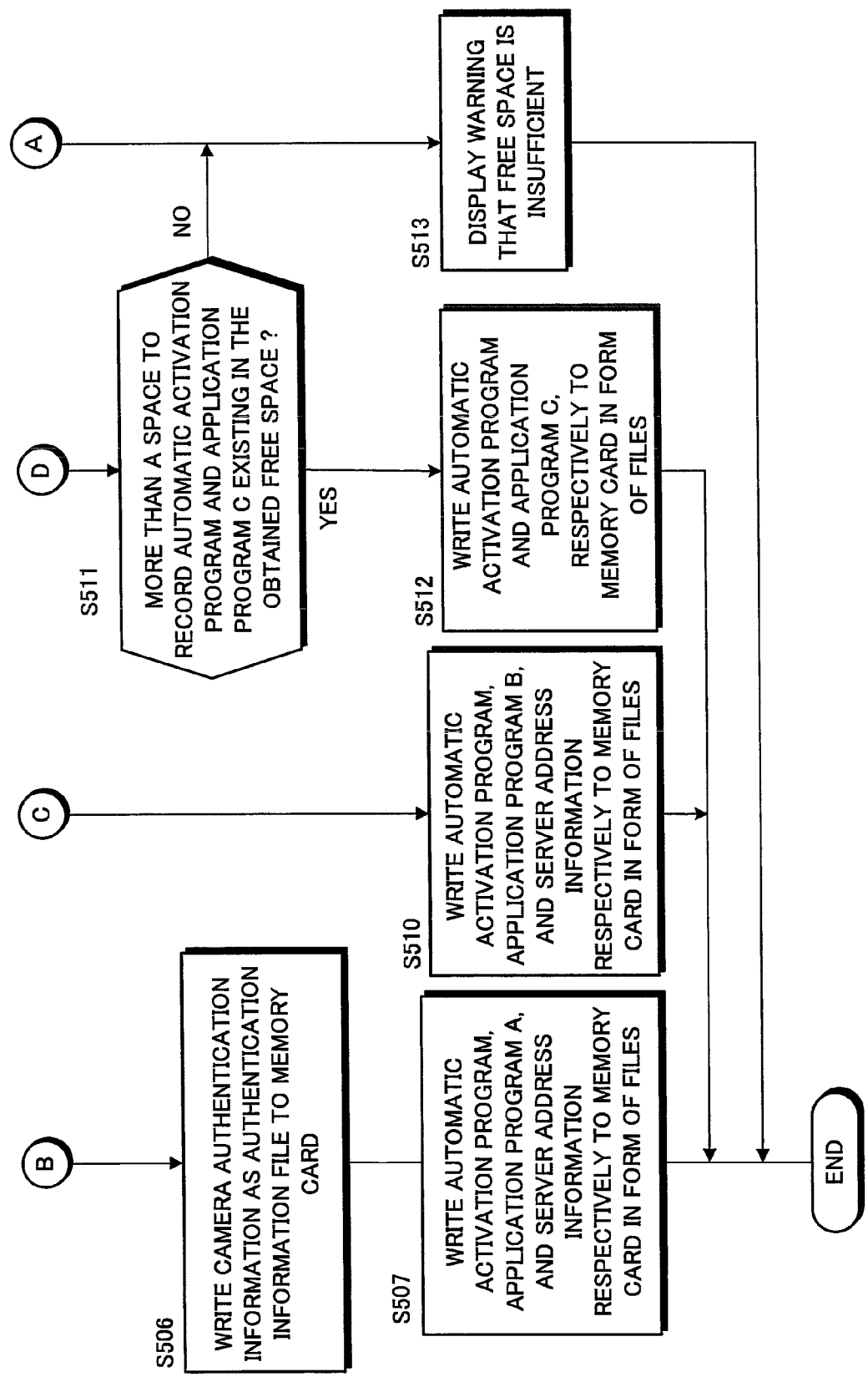
FIG. 5B is a flowchart illustrating a processing procedure following the processing procedure shown in the flowchart of FIG. 5A.

FIGS. 5A and 5B are flowcharts illustrating a processing procedure executed by the processing unit 204 of the electronic camera 200 to write the authentication information, the application program and so on to the memory card 220. This processing procedure is included in the camera program 318. Further, it is assumed that one of an application program A enabling the PC 120 to access a predetermined server and perform user registration, an application program B for accessing a predetermined server and uploading an image file stored on the memory card 220, and an application program C for uploading an image file stored on the memory card 220 to the PC 120 is stored in advance in the camera memory.

First, when a predetermined operation, for example an operation to turn a power on, an operation of a specific button, or similar, is executed on the electronic camera 200, S501 is executed. In S501, the processing unit 204 determines whether or not the memory card 220 is attached to the electronic camera 200. When the memory card 220 is not attached, the processing unit 204 bifurcates to S514 and displays a warning display indicating that the memory card is not attached on the display unit 206 of the electronic camera 200. When the determination of S501 is affirmative, the processing advances to S502, in which the amount of available space on the attached memory card 220 is obtained (available space information is obtained). It should be noted that instead of the processing of S501, an interrupt signal may be generated when the memory card 220 is attached to the electronic camera 200, and the processing of S502 onward may be executed in accordance therewith.

In S503, the processing unit 204 accesses the status information 316 stored in the camera memory 212 and determines whether or not the application program 306 accesses a server requiring authentication. When the application program stored in the camera memory is the application program C, which does not need to access the server, a negative determination is made and the processing advances to S511. On the other hand, when the application program stored in the camera memory is the application program A or the application program B, which need to access the server, an affirmative determination is made and the processing advances to S504, in which a determination is made as to whether the required authentication information is the camera authentication information for authenticating the camera or the user authentication information obtained through user registration. As will be described below with reference to FIGS. 8 and 11, in the application program A for performing user registration, camera authentication is required, whereas in the application program B for uploading an image file stored on the memory card to the server, user authentication is required. It should be noted that the camera authentication information is unique camera information which is stored in the camera memory 212 when the camera is manufactured, whereas the user authentication information is information issued by the camera vendor when user registration is performed by accessing a predetermined server.

When the application program A is stored in the camera memory 212, the corresponding status information 316 indicates camera authentication, and the routine bifurcates to S505 from S504. In S505, a determination is made as to whether or not there is enough available space on the memory card 220 to store the camera authentication information 312, the application program A 306, the automatic activation program 302, and the server address 304. When the determination is negative, the processing bifurcates to S513, in which a warning such as "insufficient available space" is displayed on the display unit 206, whereupon the processing shown in FIGS. 5A and 5B is terminated. In this case, the user may delete unnecessary image files from the memory card 220 or attach a different memory card to the electronic camera 200 and execute the processing of FIGS. 5A and 5B again.

When the determination of S505 is affirmative, the processing unit 204 bifurcates to S506 and writes the camera authentication information to the memory card 220 as the authentication information file 410.

In S507, the processing unit 204 writes the application program A 306 stored in the camera memory 212 to the memory card 220 as the application program file 404 together with the automatic activation program file 402 for executing the application program on the PC. The processing unit 204 also writes information relating to the IP address, URL, or the like of the user registration server, which is accessed when the application program A 306 is executed, to the memory card 220 as the server address file 412.

When the application program B is stored in the camera memory 212, on the other hand, the corresponding status information 316 indicates user authentication, and therefore the processing bifurcates to S508 from S504. In S508, a determination is made as to whether or not there is enough available space on the memory card 220 to store the user authentication information 314, the application program B 306, the automatic activation program 302, and the server address information 304. When the determination is negative, the processing bifurcates to S513, in which a warning such as "insufficient available space" is displayed on the display unit 206, whereupon the processing shown in FIGS. 5A and 5B is terminated. When the determination of S508 is affirmative, the processing unit 204 bifurcates to S509 and writes the user authentication information to the memory card 220 as the authentication information file 410.

In S510, the processing unit 204 writes the application program B 306 stored in the camera memory 212 to the memory card 220 as the application program file 404 together with the automatic activation program file 402 for executing the application program on the PC. The processing unit 204 also writes information relating to the IP address, URL, or the like of the server serving as the upload destination of the image file, which is accessed when the application program B 306 is executed, to the memory card 220 as the server address file 412.

When the application program C 306 is stored in the camera memory 212, it is determined in S503 that authentication is not required, and the processing bifurcates to S511. In S511, a determination is made as to whether or not there is enough available space on the memory card 220 to store the application program C 306 and the automatic activation program 302. When the determination is negative, the processing bifurcates to S513, in which a warning such as "insufficient available space" is displayed on the display unit 206, whereupon the processing shown in FIGS. 5A and 5B is terminated.

When the determination of S511 is affirmative, the processing unit 204 bifurcates to S512 and writes the application program C 306 stored in the camera memory 212 to the memory card 220 as the application program file 404 together with the automatic activation program file 402 for executing the application program on the PC.

Figure 6:
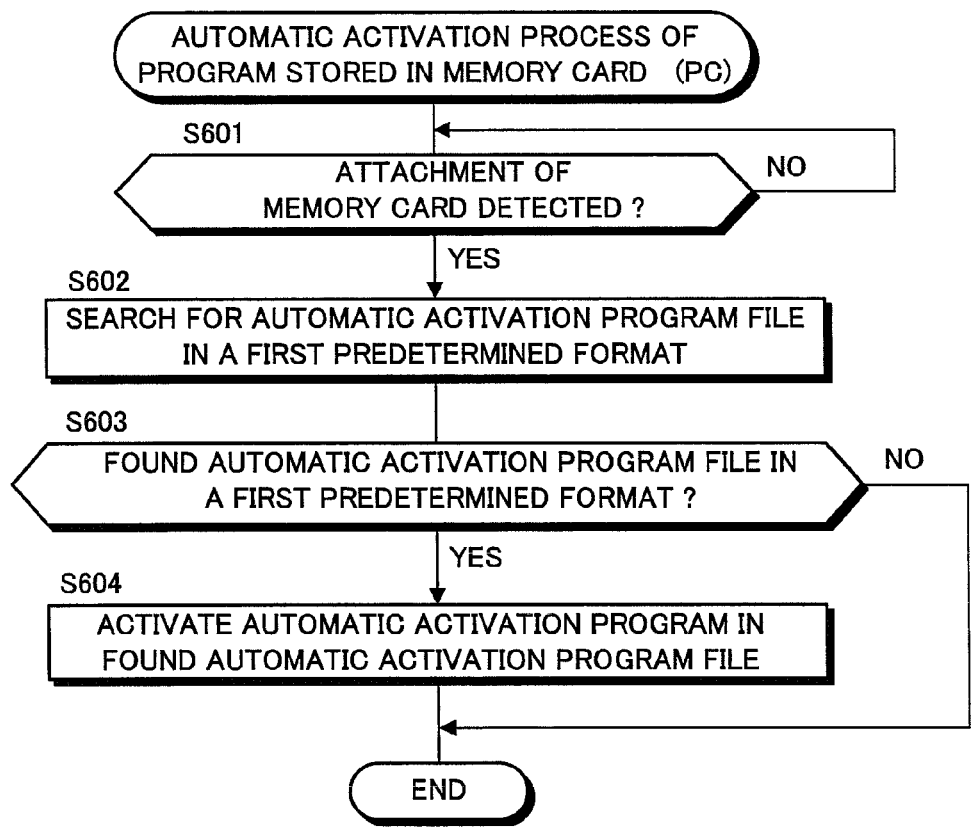
FIG. 6 is a flowchart illustrating a procedure executed when an OS of a PC searches the memory card for an automatic activation program and executes the automatic activation program after detecting attachment of the memory card.
Figure 7:
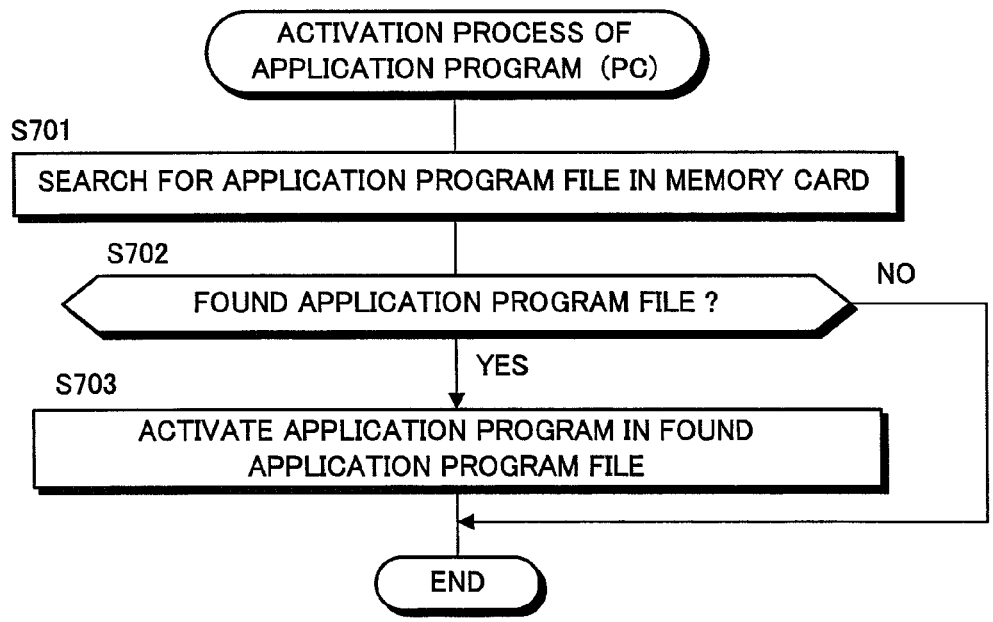
FIG. 7 is a flowchart illustrating a procedure in which an application program is searched by executing the procedure shown in the flowchart of FIG. 6, and in which the searched application program is executed by the PC.
Figure 8:
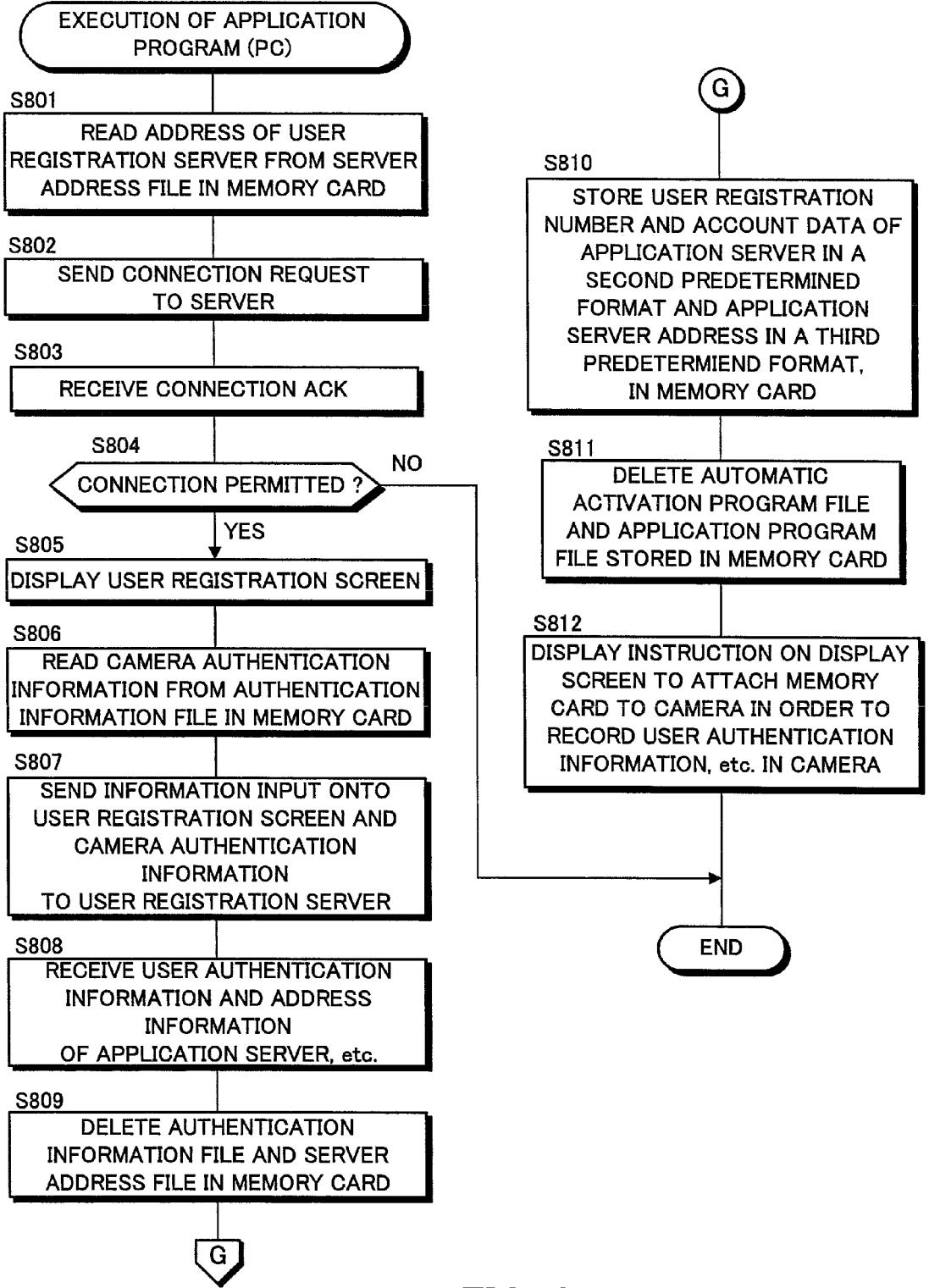
FIG. 8 is a flowchart illustrating an exemplary procedure of an automatic activation application program executed by the PC, in which procedure user registration is performed.

Through the processing described above with reference to FIGS. 5A and 5B, the automatic activation program file 402 and the application program file 404 are written to the memory card 220, as well as the authentication information file 410 and the server address file 412 if necessary. When the memory card 220 is removed from the electronic camera 200 and attached to the memory card interface 501 provided in the PC 120 or to a card reader connected to the PC 120 by a cable or wirelessly (hereafter, attaching the memory card to the memory card interface 501 provided in the PC or to a card reader connected to the PC will be referred to simply as "attaching the memory card to the PC"), a processing procedure to be described below with reference to FIGS. 6 to 8 is executed automatically on the PC 120. It should be noted that in the examples where the application program B and the application program C are written to the memory card 220, it is assumed that an image data file is stored on the memory card before the processing of FIGS. 5A and 5B is executed.

In S601, the PC 120 determines whether or not attachment of the memory card 220 to the memory card interface 501 is detected. The processing of S601 is repeated until the determination becomes affirmative, and when the determination of S601 is affirmative, the processing advances to S602. Instead of performing so-called polling processing in S601, an interrupt signal may be generated when the memory card 220 is attached to the memory card interface 501, and the processing of S602 onward may be started when the signal is detected.

In S602, the PC 120 searches for the automatic activation program file having the first predetermined format stored in the memory card 220, for example a program file having a specific file name or a program file stored in a specific folder (directory) of the memory card. In S603, the PC 120 determines whether or not the automatic activation program file having the first predetermined format is found, and when the determination is negative, the processing of FIG. 6 is terminated immediately. When the determination of S603 is affirmative, on the other hand, the processing advances to S604, in which the PC 120 reads and begins execution of the automatic activation program in the found automatic activation program file, whereupon the processing of FIG. 6 is terminated. It should be noted that the function for searching for, reading, and beginning execution of the automatic activation program file from the memory card is executed by a program stored in advance in the storage unit 505 of the PC 120, but this function may be included in the OS as a pre-installed resident program that is executed upon activation of the OS, for example.

FIG. 7 is a flowchart illustrating a processing procedure of the automatic activation program executed by the PC 120. When execution of the automatic activation program begins, the PC 120 executes the processing shown in the flowchart of FIG. 7 in sequence. In S701, the PC 120 searches the memory card 220 for the application program file. In S702, the PC 120 determines whether or not the target application program is found. When the determination is negative, the processing of FIG. 7 is terminated, and when the determination is affirmative, the processing advances to S703. In S703, the PC 120 loads the application program file found in the memory card 220 to the RAM of the PC 120 and begins execution thereof, whereupon the processing of FIG. 7 is terminated.

FIG. 8 is a flowchart showing a processing procedure relating to an example of the application program executed by the PC 120 in S703 of FIG. 7, and corresponds to a case in which "YES" is selected in both S504 and S505 in FIGS. 5A and 5B. When the application program shown in FIG. 8 is executed, the PC 120 accesses a user registration server via a communication line and sends the camera authentication information and information input by the user of the electronic camera 200 to the user registration server to prompt user registration. Once user registration is complete, the PC 120 performs processing to write user authentication information and so on issued by the user registration server to the memory card 220 attached to the memory card interface 501.

When the user attaches the memory card 220 to the electronic camera 200 for the first time following purchase of the electronic camera 200, a user registration application program (the program that executes the processing of FIG. 8) is written to the memory card 220 together with the camera authentication information and the IP address of the user registration server by the processing shown in S506 and S507 of FIG. 5B. When the memory card 220 is attached to the PC 120, the automatic activation program is executed, whereby the application program that executes the processing of FIG. 8 is activated and user registration processing is executed. It is assumed in the following description that the server 102 (FIG. 1) serves as the user registration server (user registration processing server).

In S801, the PC 120 reads address information relating to the user registration server 102 from the server address file 412 stored on the memory card 220, and in S802, the PC 120 sends a connection request to the user registration server 102 via a communication line connected to the communication interface 504. In S803, the PC 120 receives a connection acknowledgement from the user registration server 102, and in S804 the PC 120 determines whether or not connection is permitted. When the determination of S804 is negative, the PC 120 terminates the processing of FIG. 8, and when the determination of S804 is affirmative, the processing advances to S805. In S805, the PC 120 opens an HTML file sent by the user registration server 102 and displays a user registration screen on the display 503. In S806, the PC 120 reads the camera authentication information from the authentication information file 410 in the memory card 220. In S807, the PC 120 sends information input by the user onto the user registration screen (a user name, an email address, a user address, and so on) to the user registration server 102 together with the camera authentication information. In S808, the PC 120 receives user authentication information issued by the user registration server 102 and address information relating to an application server sent by the user registration server 102. The application server is a server capable of providing various services from the camera vendor in accordance with the type and so on of the electronic camera 200 purchased by the user.

In S809, the PC 120 deletes the authentication information file 410 and the server address file 412 stored in the memory card 220. In S810, the PC 120 sets the user authentication information issued by the user registration server 102, for example a user registration number and account data required during connection to the application server, as an authentication information file in a second predetermined format, sets the address information relating to the application server as a server address file in a third predetermined format, and then writes the respective files to the memory card 220. Here, the second predetermined format is a file format according to which, when the camera program finds a file in this format, the file can be recognized as a file including the user authentication information. Further, the third predetermined format is a file format according to which, when the camera program finds a file in this format, the file can be recognized as the server address file.

In S811, the PC 120 deletes the automatic activation program file 402 and the application program file 404 from the memory card 220. In S812, the PC 120 displays an instruction on the display 503 of the PC 120 to remove the memory card 220 from the PC 120 and attach it to the electronic camera 200 in order to store the user authentication information and the address of the application server on the electronic camera 200, and then terminates the processing of FIG. 8.

Figure 9:
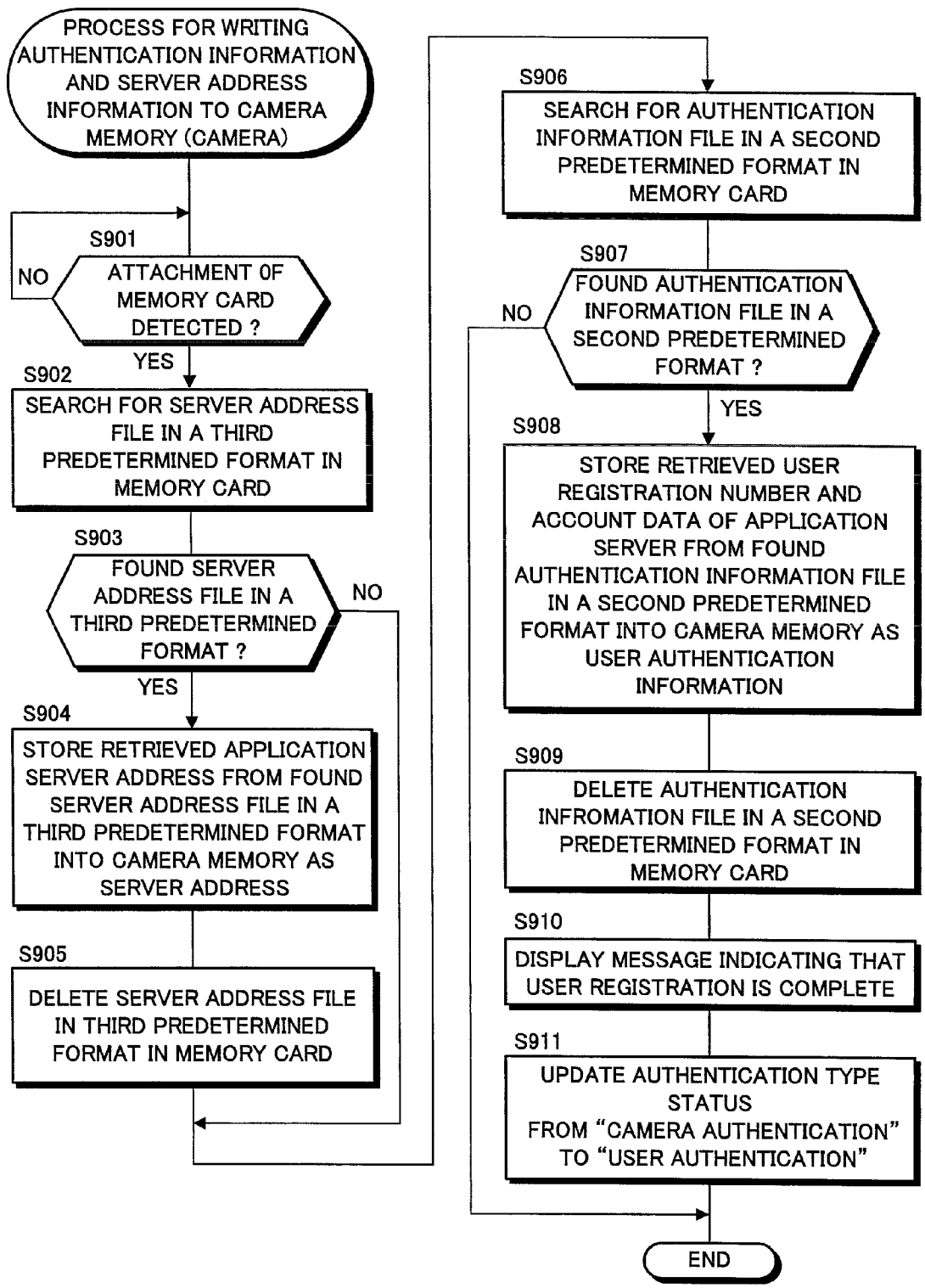
FIG. 9 is a flowchart illustrating a processing procedure of a program for retrieving server address information and authentication information stored on the memory card and storing this information in a camera memory, which is executed by the camera.

FIG. 9 is a flowchart illustrating processing executed by the processing unit 204 of the electronic camera 200 when the memory card 220 is attached the electronic camera 200, in which memory card, the authentication information file in the second predetermined format and the server address file in the third predetermined format is written when the processing shown in FIG. 8 is executed automatically on the PC 120 as described above. In the processing shown in FIG. 9, the authentication information file in the second predetermined format and the server address file in the third predetermined format stored on the memory card 220 are read, and the extracted information is stored in the camera memory 212.

In S901, the processing unit 204 determines whether or not the memory card 220 is attached to the electronic camera 200, and the processing of S901 is performed repeatedly until the determination becomes affirmative. When the determination of S901 is affirmative, the processing advances to S902, in which the memory card 220 is searched for the server address file in the third predetermined format. Next, in S903, the processing unit 204 determines whether or not the server address file in the third predetermined format is found in the memory card 220. When the determination is affirmative, the processing advances to S904, and when the determination is negative, the processing bifurcates to S906.

In S904, the processing unit 204 reads the address (IP address, URL, etc.) of the application server from the found server address file in the third predetermined format, and updates the server address information in the camera memory 212. In S905, the processing unit 204 deletes the server address file in the third predetermined format from the memory card 220.

In S906, the processing unit 204 searches the memory card 220 for the authentication information file in the second predetermined format. Next, in S907, the processing unit 204 determines whether or not the authentication information file in the second predetermined format is found in the memory card 220. When the determination is affirmative, the processing advances to S908, and when the determination is negative, the processing shown in FIG. 9 is terminated.

In S908, the processing unit 204 reads the user registration number and the account data of the application server from the found authentication information file in the second predetermined format, and stores this information in the camera memory 212 as the user authentication information. In S909, the processing unit 204 deletes the authentication information file in the second predetermined format from the memory card 220.

In S910, the processing unit 204 displays a message on the display unit 206 of the electronic camera 200 indicating that user registration is complete, and then rewrites the status information 316 stored in the camera memory 212 in S911 to modify the authentication type status setting from camera authenticated to user authenticated.

By means of the processing performed by the processing unit 204 and described above with reference to FIG. 9, the user authentication information and the newest server address information are written to the camera memory 212 and the authentication status information is updated. At this time, the user authentication information and so on are not left on the memory card 220, and therefore personal information leaks, unlawful access to the application server by a person other than the original user, and so on can be suppressed if the memory card 220 is lost. Further, the authentication status in the authentication status information 316 is modified to user authenticated, and therefore, following this processing, a situation in which the user is led back to the user registration site when the same or another memory card 220 is attached to the electronic camera 200 does not occur again.

Examples of the application programs executed on the PC 120 will be described below with reference to FIG. 10 to FIGS. 13A and 13B. As described above with reference to FIGS. 5A and 5B, when a single application program 306 is stored in the camera memory 212, that application program is stored on the memory card 220 when the memory card 220 is attached to the electronic camera 200. When a plurality of application programs 306 are stored in the camera memory 212, on the other hand, the electronic camera 200 displays a screen enabling the user to select an application program on the display of the display unit 206. The user selects the desired application program by operating the electronic camera 200. On the basis of the selection result, the automatic activation program file 402 and the application program file 404 are written to the memory card 220 together with the authentication information file 410 and the server address file 412 if necessary. The processing in all of FIG. 10 to FIGS. 13A and 13B is executed automatically by the PC 120 when the memory card 220 written with the automatic activation program file 402, the application program file 404, and so on by the electronic camera 200 as described above is attached to the PC 120.

Figure 10:
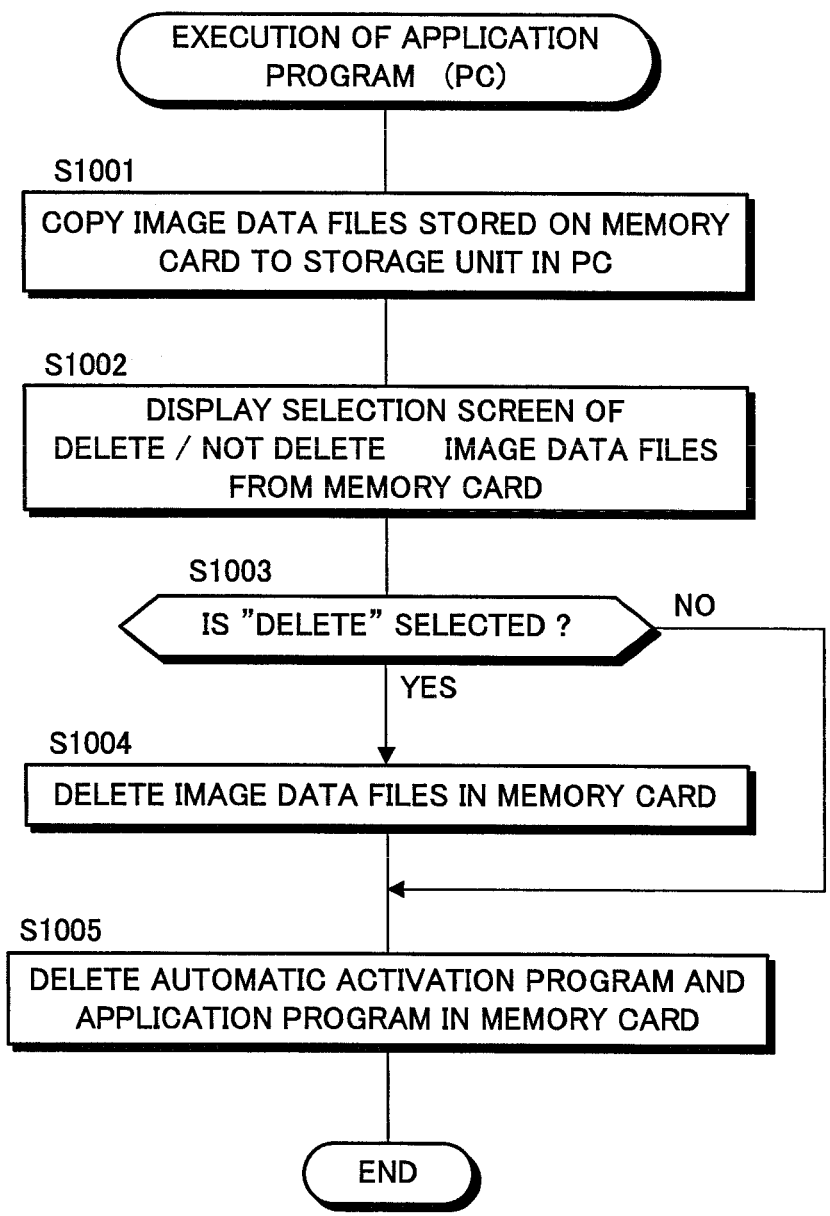
FIG. 10 is a flowchart illustrating an exemplary procedure of an application program executed by the PC, in which procedure an image data file in the memory card is copied to a storage device of the PC.

The flowchart shown in FIG. 10 shows an example of so-called offline processing in which connection to the application servers 102, 104 is not required in the application program executed by the PC 120. This application is used to copy or move an image data file 420 stored on the memory card 220 to the storage device 505 in the PC 120.

In S1001, the PC 120 copies all of the image data files 420 stored on the memory card 220 attached to the memory card interface 501 to the storage unit 505 of the PC 120. In S1002, the PC 120 displays a selection screen enabling the user to delete the image data files 420 from the memory card 220 or keep the image data files 420 on the display 503 of the PC 120. In S1003, the PC 120 determines whether or not deletion of the image data files 420 is selected. When the determination is negative, the processing bifurcates to S1005, and when the determination is affirmative, the processing advances to S1004, in which the image data files 420 are deleted from the memory card 220. In S1005, the PC 120 deletes the automatic activation program and the application program written in the memory card 220, and then terminates the processing of FIG. 10.

Figure 11:
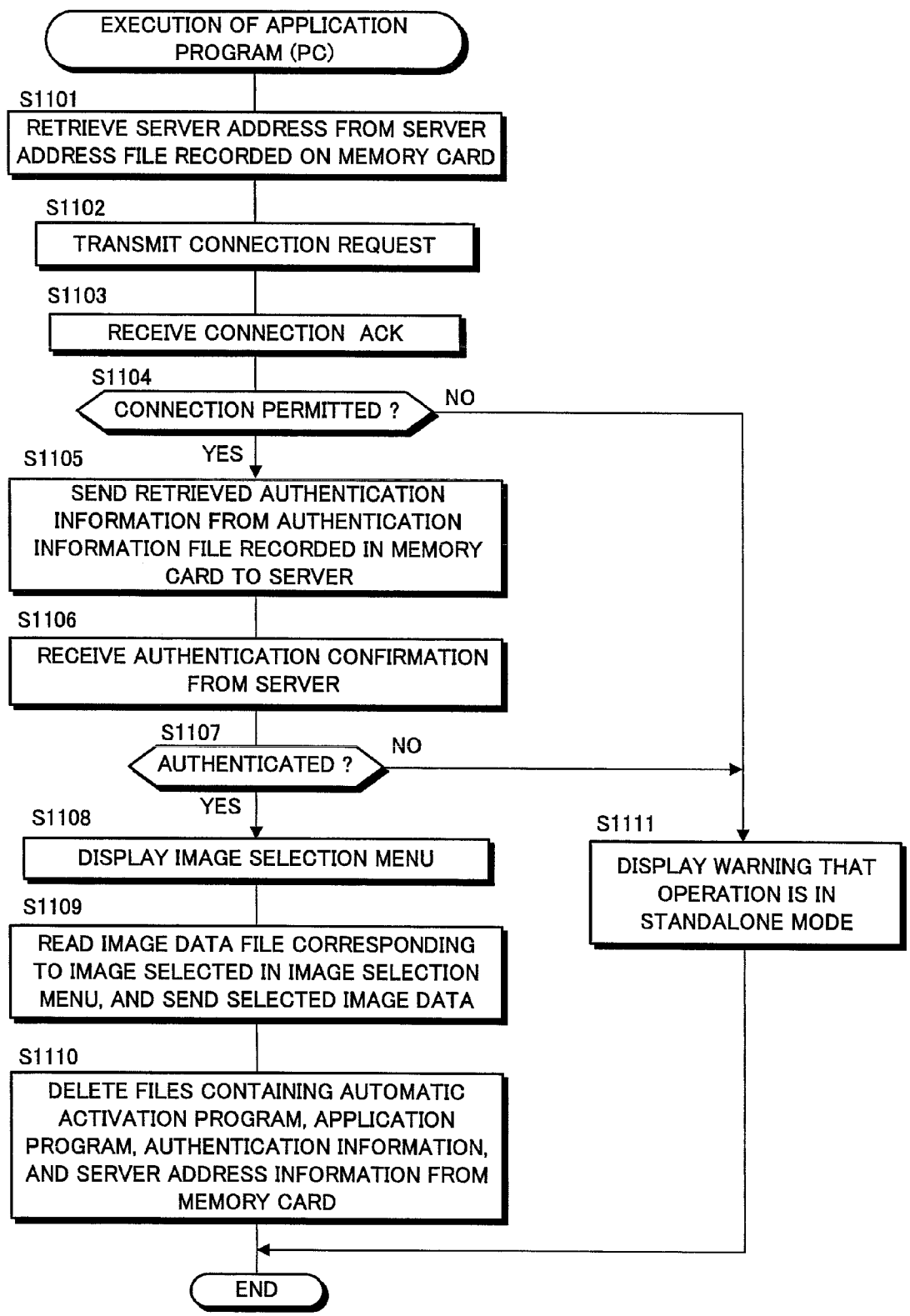
FIG. 11 is a flowchart illustrating an exemplary procedure of an automatic activation application program executed by the PC, in which procedure the image data file in the memory card is transferred to the application server.

The flowchart shown in FIG. 11 shows an example in which connection to the application server 102 or 104 is required in the application program executed by the PC 120. The processing shown in FIG. 11 is used to read an image selected by the user to the PC 120 from the memory card 220 and send (upload) the image to the application server. It is assumed as a prerequisite for execution of the processing shown in FIG. 11 that the automatic activation program file 402 and the application program file 404 are stored on the memory card 220 together with the server address file 412 and the authentication information file 410.

In S1101, the PC 120 retrieves the server address information from the server address file 412 stored on the memory card 220 attached to the memory card interface 501. In S1102, the PC 120 accesses the application server 102 or 104 specified by the server address information (to be referred to simply as the application server hereafter) and sends a connection request thereto. In S1103, the PC 120 receives a connection acknowledgement from the application server. On the basis of the connection acknowledgement result, the PC 120 determines in S1104 whether or not connection permission is received from the application server. When the determination is negative, the processing bifurcates to S1111, and when the determination is affirmative, the processing advances to S1105. In S1105, the PC 120 reads the authentication information from the authentication information file 410 stored on the memory card 220 and sends the authentication information to the connection destination application server. In S1106, the PC 120 receives an authentication confirmation from the application server and determines in S1107 whether or not authentication is achieved. When the determination of S1107 is negative, or in other words when authentication has not been achieved, the processing bifurcates to S1111, and when the determination is affirmative, the processing advances to S1108.

In S1108, the PC 120 displays a screen enabling the user to select a desired image from the image data files stored on the memory card 220 on the display 503. The user selects a desired image (an image to be uploaded) from the images displayed on the display 503. In S1109, the PC 120 reads the image data file corresponding to the image selected by the user on the image selection screen from the memory card 220, and sends the image data file to the application server. Next, in S1110, the PC 120 deletes the automatic activation program file 402, the application program file 404, the authentication information file 410, and the server address file 412 from the memory card 220 and then terminates the processing. In S1110, the image data file sent to the application server or all of the image data files stored on the memory card may be deleted from the memory card 220.

In S1111, which serves as the bifurcation destination when the determinations of S1104 and S1107 are negative, or in other words when connection permission is not received from the application server or user authentication has not been completed, the PC 120 displays a warning on the display 503 indicating a standalone mode, and then terminates the processing.

The flowchart of FIG. 11 shows an example in which the processing is terminated without executing the processing step of S1110 when the processing bifurcates to S1111. The reason for this is that when a connection to the application server cannot be established for any reason, user operations may become complicated if the automatic activation program file 402, application program file 404, authentication information file 410 and server address file 412 are deleted from the memory card 220. More specifically, when the user is unable to connect to the application server successfully and attempts to execute the same application program again, the memory card 220 must be reattached to the electronic camera 200 and the operation to write these files must be performed again. With regard to this, a processing step that allows the user to choose appropriately between leaving the automatic activation program file 402, application program file 404, authentication information file 410, and server address file 412 on the memory card 220 or deleting the files may be added following the processing of S1111, for example.

Figure 12:
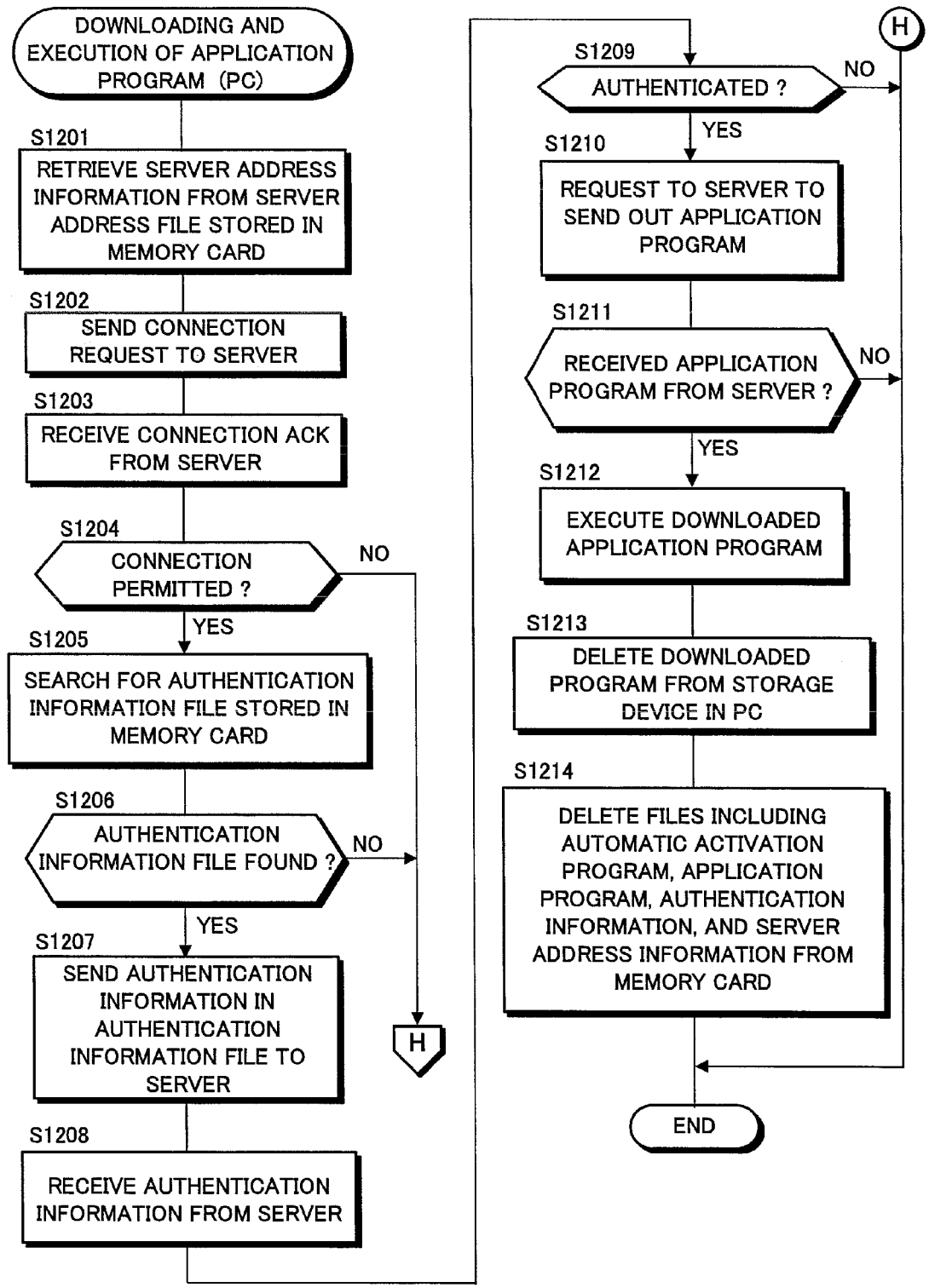
FIG. 12 is a flowchart illustrating an exemplary procedure of an automatic activation application program executed by the PC, in which procedure a program stored in the application server is downloaded to the PC, the downloaded program is executed by the PC, and the downloaded program is finally deleted by the PC.

The flowchart shown in FIG. 12 also shows an example in which connection to the application server is required in the application program executed by the PC 120. The processing shown in FIG. 12 is used to download a program from the application server and execute the program immediately on the PC 120. In other words, in this example, the program downloaded from the application server is not written to the memory card 220, and is deleted as soon as the processing shown in FIG. 12 is complete. It is assumed as a prerequisite for executing the processing shown in FIG. 12 that the automatic activation program file 402 and the application program file 404 are stored on the memory card 220 together with the server address file 412 and the authentication information file 410.

In S1201, the PC 120 retrieves the server address information from the server address file 412 stored on the memory card 220. In S1202, the PC 120 accesses the application server specified by the server address information and sends a connection request thereto. In S1203, the PC 120 receives a connection acknowledgement from the application server. On the basis of the connection acknowledgement result, the PC 120 determines in S1204 whether or not connection permission is received from the application server. When the determination is negative, the processing of FIG. 12 is terminated, and when the determination is affirmative, the processing advances to S1205. In S1205, the PC 120 searches the memory card 220 for the authentication information file 410. In S1206, the PC 120 determines whether or not the authentication information file 410 is found. When the determination is negative, the processing of FIG. 12 is terminated, and when the determination is affirmative, the processing advances to S1207. In S1207, the PC 120 sends the user authentication information included in the authentication information file 410 to the connection destination application server. In S1208, the PC 120 receives authentication confirmation information from the application server and then determines in S1209 whether or not authentication is achieved. When the determination of S1209 is negative, or in other words when authentication has not been achieved, the processing of FIG. 12 is terminated, and when the determination is affirmative, the processing advances to S1210.

In S1210, the PC 120 issues a request to the server to send a predetermined application program. In S1211, the PC 120 determines whether or not the requested predetermined application program is received from the server. When the determination of S1211 is negative, the processing of FIG. 12 is terminated, and when the determination is affirmative, the processing advances to S1212. In S1212, the PC 120 executes the downloaded application program, and when execution of the downloaded application program is complete, the processing advances to S1213, in which the downloaded application program is deleted from the storage device of the PC 120. In S1214, the PC 120 deletes the automatic activation program file 402, application program file 404, authentication information file 410, and server address file 412 from the memory card 220 and then terminates the processing. It should be noted that the PC 120 need not delete the downloaded application program in S1211.

As is evident from the above description, the application program shown in FIG. 12 is a predetermined application program downloaded from the application server, executed on the PC 120, and deleted from the storage device of the PC 120 following the execution. Examples of the program downloaded from the application server include an image adjustment program, an image editing program, and so on, and a latest program may be used at all times.

Also in the example shown in FIG. 12, on the basis of a similar premise to that described with reference to FIG. 11, the processing of FIG. 12 is terminated without deleting the automatic activation program file 402, application program file 404, authentication information file 410, and server address file 412 from the memory card 220 when connection permission is not received from the application server or user authentication has not been completed. With regard to this, a processing step that allows the user to choose appropriately between leaving the automatic activation program file 402, application program file 404, authentication information file 410, and server address file 412 on the memory card 220 or deleting the files may be added when connection permission is not received from the application server or user authentication has not been completed.

Figure 13A:
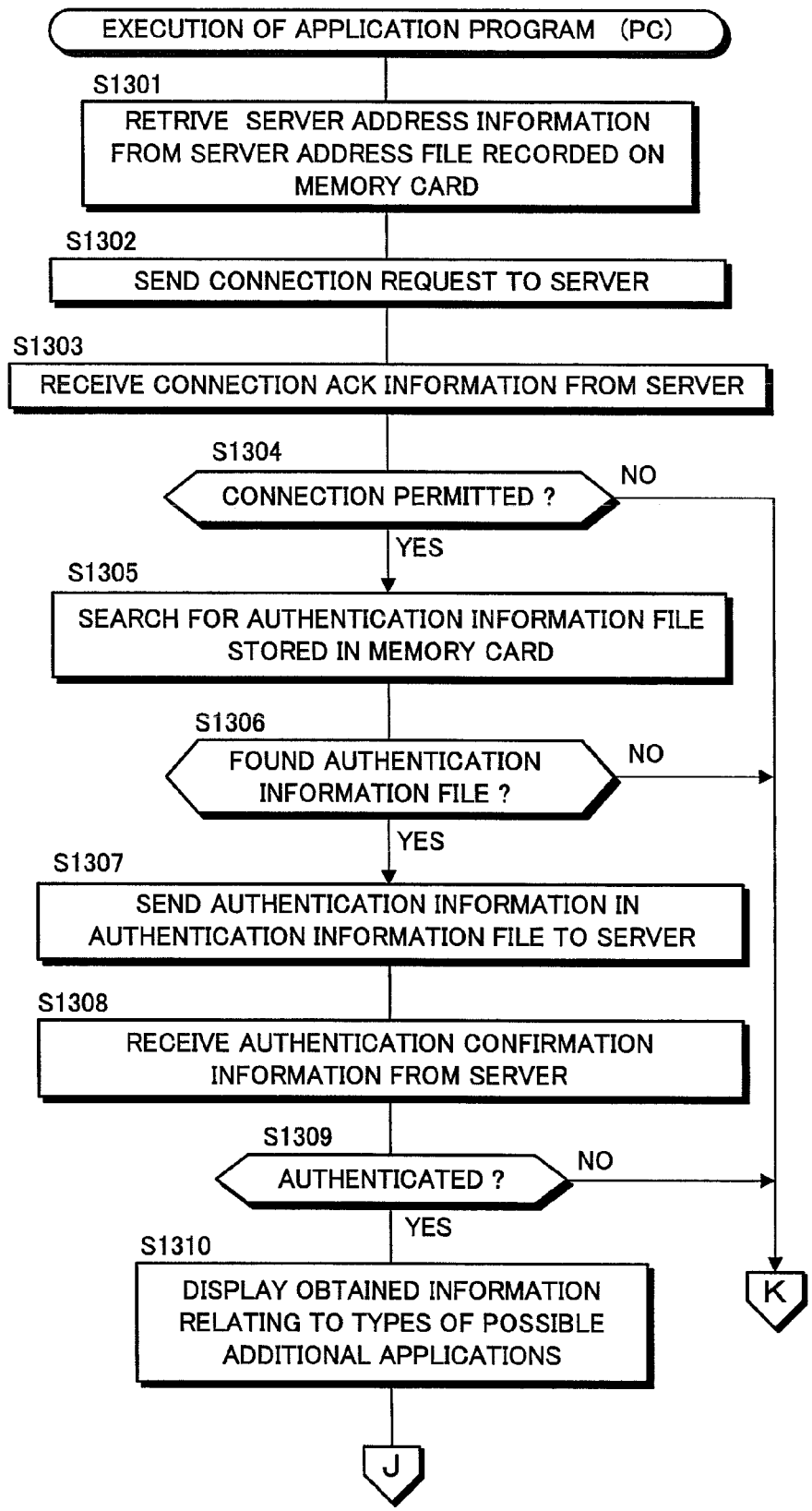
FIG. 13A is a flowchart illustrating an exemplary procedure of an automatic activation application program executed by the PC, in which procedure an additional application program is downloaded and the downloaded additional application program is stored in the memory card.
Figure 13B:
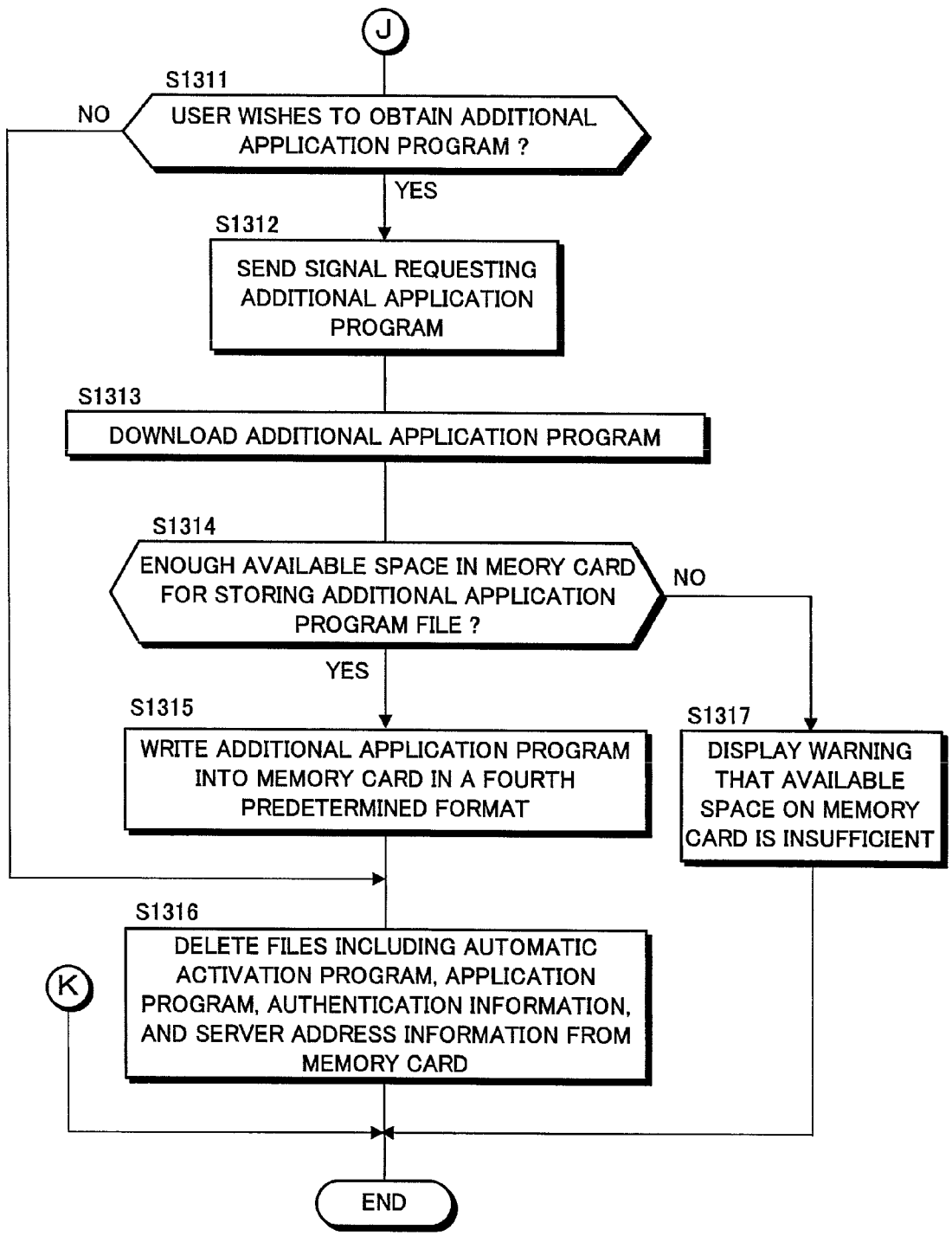
FIG. 13B is a flowchart illustrating a processing procedure following the processing procedure shown in the flowchart of FIG. 13A.

Similarly to the flowchart shown in FIG. 12, the flowcharts shown in FIGS. 13A and 13B show an example in which connection to the application server is required in the application program executed by the PC 120. The processing shown in FIGS. 13A and 13B is used to download an additional application program from the application server and write the additional application program to the memory card 220. It is assumed as a prerequisite for executing the processing shown in FIGS. 13A and 13B that the automatic activation program file 402 and the application program file 404 are stored on the memory card 220 together with the server address file 412 and the authentication information file 410.

In S1301, the PC 120 reads the server address information from the server address file 412 stored on the memory card 220. In S1302, the PC 120 accesses the application server specified by the server address information and sends a connection request thereto. In S1303, the PC 120 receives a connection acknowledgement from the application server. On the basis of the connection acknowledgement result, the PC 120 determines in S1304 whether or not connection permission is received from the application server. When the determination is negative, the processing of FIGS. 13A and 13B is terminated, and when the determination is affirmative, the processing advances to S1305. In S1305, the PC 120 searches the memory card 220 for the authentication information file 410. In S1306, the PC 120 determines whether or not the authentication information file 410 is found. When the determination is negative, the processing of FIGS. 13A and 13B is terminated, and when the determination is affirmative, the processing advances to S1307. In S1307, the PC 120 sends the user authentication information included in the authentication information file 410 to the connection destination application server. In S1308, the PC 120 receives authentication confirmation information from the application server and then determines in S1309 whether or not authentication is achieved. When the determination of S1309 is negative, or in other words when authentication has not been achieved, the processing of FIGS. 13A and 13B is terminated, and when the determination is affirmative, the processing advances to S1310.

In S1310, the PC 120 obtains information relating to the types of possible additional applications from the application server and displays this information on the display 503 of the PC 120. In S1311, the PC 120 detects a user operation and determines whether or not the user wishes to obtain an additional application program. When the determination is negative, the processing bifurcates to S1316, and when the determination is affirmative, the processing advances to S1312. In S1312, the PC 120 sends a signal requesting the additional application program to the application server. In accordance with transmission of this signal, the PC 120 downloads the additional application program sent from the application server in S1313.

In S1314, the PC 120 determines whether or not the memory card 220 attached to the memory card interface 501 has enough available space to store the additional application program file. When the determination is negative, the processing bifurcates to S1317, in which a warning indicating a lack of available space on the memory card is displayed on the display 503 of the PC 120, whereupon the processing of FIGS. 13A and 13B is terminated. When the determination of S1314 is affirmative, on the other hand, the processing advances to S1315, in which the PC 120 writes the additional application program to the memory card 220 as a file in a fourth predetermined format. Here, the fourth predetermined format file is a file format according to which, when the camera program finds a file in this format, the file can be recognized as a file including the additional application program. In S1316, the PC 120 deletes the automatic activation program file 402, application program file 404, authentication information file 410, and server address file 412 from the memory card 220 and then terminates the processing.

In the example shown in FIGS. 13A and 13B, on the basis of a similar premise to that described with reference to FIG. 11, the processing of FIGS. 13A and 13B is terminated without deleting the automatic activation program file 402, application program file 404, authentication information file 410, and server address file 412 from the memory card 220 when connection permission is not received from the application server, when user authentication has not been completed, and when the memory card 220 does not have enough available space. With regard to this, a processing step that allows the user to choose appropriately between leaving the automatic activation program file 402, application program file 404, authentication information file 410, and server address file 412 on the memory card 220 or deleting the files may be added when connection permission is not received from the application server or user authentication has not been completed.

When it is determined in S1311 that the user does not wish to obtain the additional application program, the automatic activation program file 402, application program file 404, authentication information file 410, and server address file 412 are deleted from the memory card 220, assuming that the user does not wish to execute the application program of FIGS. 13A and 13B. However, in this case, a processing step allowing the user to choose appropriately between leaving or deleting the files may be added.

Figure 14:
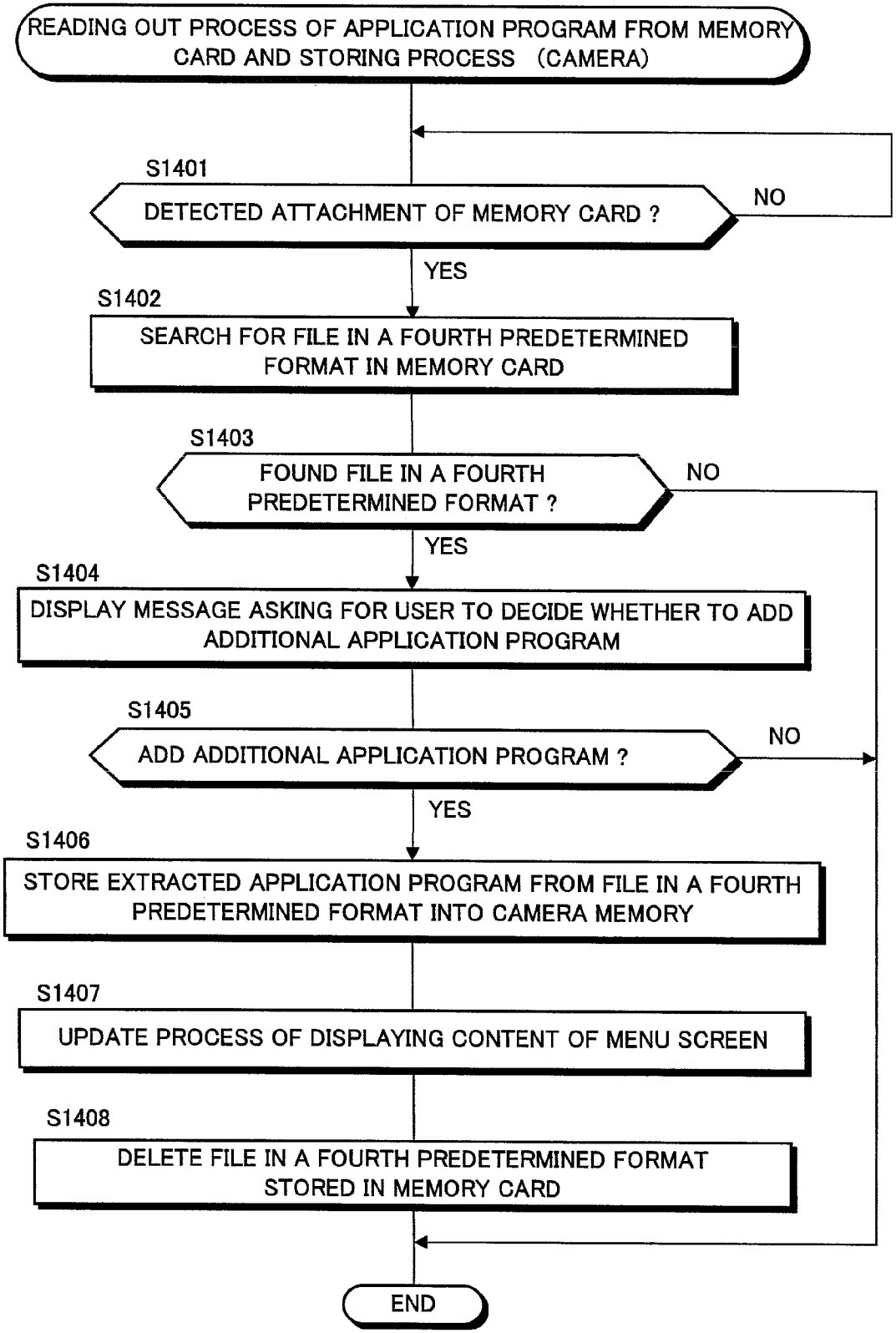
FIG. 14 is a flowchart illustrating a procedure executed by the camera, in which procedure the additional application program in the memory card is retrieved and the retrieved additional application program is stored in the camera memory.

FIG. 14 is a flowchart illustrating a processing procedure executed by the processing unit 204 of the electronic camera 200 to read and store an application program from the memory card 220. The processing of FIG. 14 is executed when the memory card 220, on which the additional application program file is stored in the fourth predetermined format as a result of the processing performed by the PC 120 in FIGS. 13A and 13B, is attached to the electronic camera 200. By means of the processing shown in FIG. 14, the application program file stored on the memory card 220 in the fourth predetermined format is read, and the extracted application program is stored in the camera memory 212.

In S1401, the processing unit 204 determines whether or not the memory card 220 is attached to the electronic camera 200, and the processing of S1401 is performed repeatedly until the determination becomes affirmative. When the determination of S1401 is affirmative, the processing advances to S1402, in which the memory card 220 is searched for the fourth predetermined format file (the additional application program file). Next, in S1403, the processing unit 204 determines whether or not the fourth predetermined format file is found in the memory card 220. When the determination is negative, the processing of FIG. 14 is terminated, and when the determination is affirmative, the processing advances to S1404.

In S1404, the processing unit 204 displays a message on the display unit 206 asking the user to decide whether or not the application program included in the found fourth predetermined format file is to be added to the camera memory 212. In S1405, the processing unit 204 determines whether or not the user wishes to add the additional application program. When the determination is negative, the processing of FIG. 14 is terminated, and when the determination is affirmative, the processing advances to S1406.

In S1406, the processing unit 204 extracts the application program from the fourth predetermined format file found in the memory card 220 and stores the extracted application program in the flash memory 212B of the camera memory 212 as an additional application program. In S1407, the processing unit 204 performs processing to update the display content of a menu screen. More specifically, the processing unit 204 updates the display content of the menu screen such that processing executed by the newly added application program can be selected on the menu screen as an application program that can be executed on the PC 120 in addition to pre-existing application programs. In S1408, the processing unit 204 deletes the fourth predetermined format file from the memory card 220. By means of the processing performed by the processing unit 204, described above with reference to FIG. 14, the additional application program is written to the camera memory 212.

Incidentally, in the processing procedure described with reference to FIGS. 5A and 5B, which is executed by the processing unit 204 of the electronic camera 200 to write the authentication information, the application program, and so on to the memory card 220, a single desired application program is selected from among a plurality of application programs. However, this invention is not limited thereto, and a plurality of application programs may be selected. An example of this will now be described with reference to FIG. 15.

Figure 15:
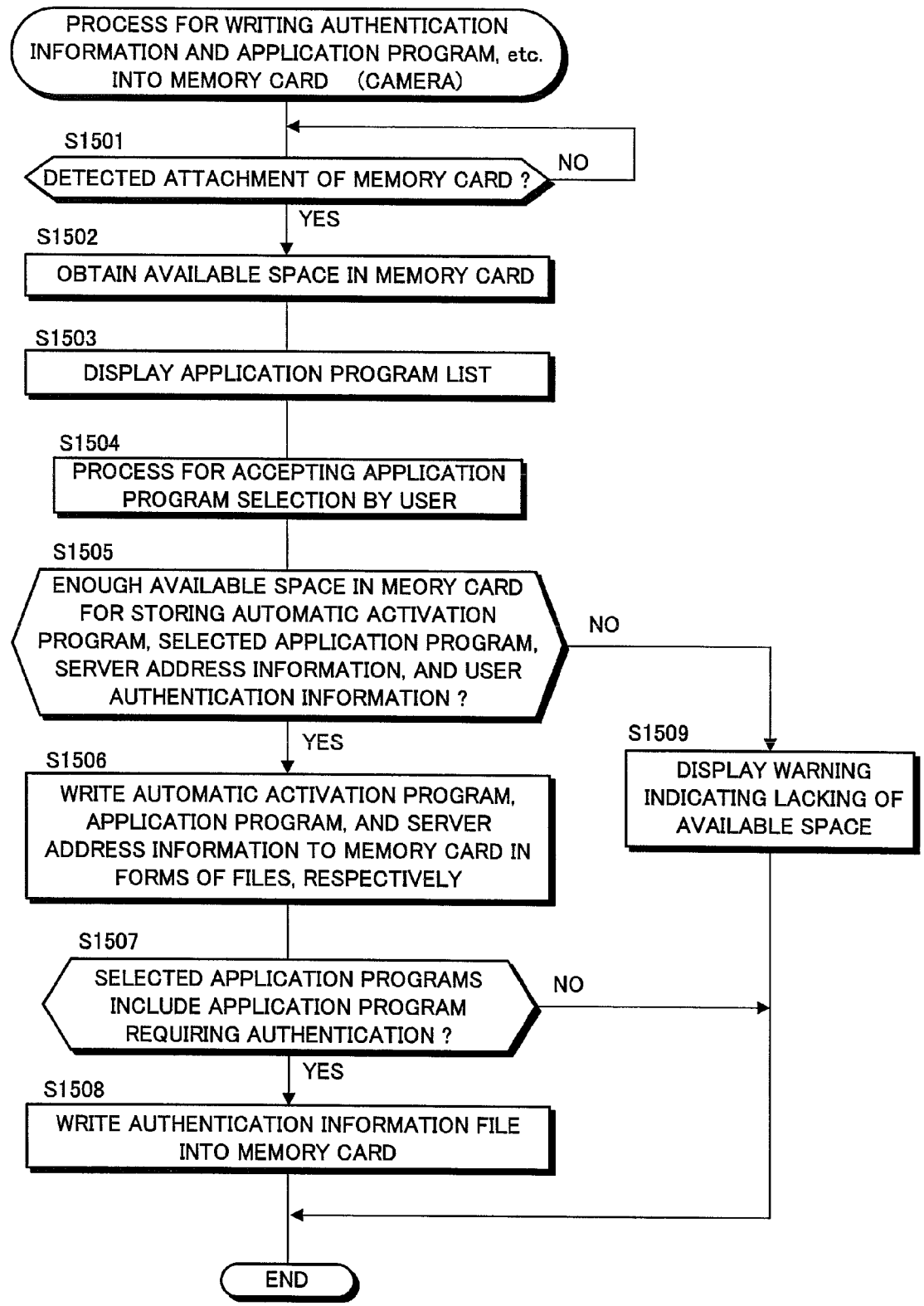
FIG. 15 is a flowchart illustrating a procedure executed by the camera, in which procedure the automatic activation program, the application program, the server address information, the user authentication information, and so on are stored in the memory card.

FIG. 15 is a flowchart illustrating another example of a processing procedure executed by the processing unit 204 of the electronic camera 200 to write the authentication information, the application program, and so on to the memory card 220. This processing procedure is included in the camera program 318.

In S1501, the processing unit 204 determines whether or not the memory card 220 is attached to the electronic camera 200, and the processing of S1501 is performed repeatedly until the determination becomes affirmative. When the determination of S1501 is affirmative, the processing advances to S1502, in which the available space of the attached memory card 220 is obtained. Similarly to the processing described above with reference to FIGS. 5A and 5B, instead of the processing of S1501, an interrupt signal may be generated when the memory card 220 is attached to the electronic camera 200, and the processing of S1502 onward may be executed in accordance therewith.

In S1502, the processing unit 204 obtains the available space of the attached memory card 220. In S1503, the processing unit 204 displays an application program list on the display unit 206 of the electronic camera 200 and then receives an application program selection from the user in S1504. In S1505, the processing unit 204 determines whether or not the available space of the memory card is equal to or greater than the space required to store the application programs selected by the user in S1504 as well as the automatic activation program, the server address information, and the user authentication information. When the determination is negative, the processing bifurcates to S1509, in which a warning indicating a lack of available space is displayed on the display unit 206, whereupon the processing of FIG. 15 is terminated. When the determination of S1505 is affirmative, on the other hand, the processing unit 204 writes the automatic activation program file 402, the application program file 404, and if necessary the server address file 412 to the memory card 220 in S1506.

In S1507, the processing unit 204 determines whether or not the application programs selected by the user include an application program requiring authentication. When the determination is negative, or in other words when it is determined that an application program requiring authentication information is not included in the selected application programs, the processing of FIG. 15 is terminated. When the determination of S1507 is affirmative, on the other hand, or in other words when it is determined that an application program requiring authentication information is included in the selected application programs, the processing advances to S1508, in which the user authentication information is written to the memory card 220, whereupon the processing of FIG. 15 is terminated.

By means of the processing performed by the processing unit 204 in accordance with the flowchart shown in FIG. 15, the user can select a plurality of application program at a time, enabling an improvement in operability when the plurality of application programs are executed on the PC 120.

Figure 16:
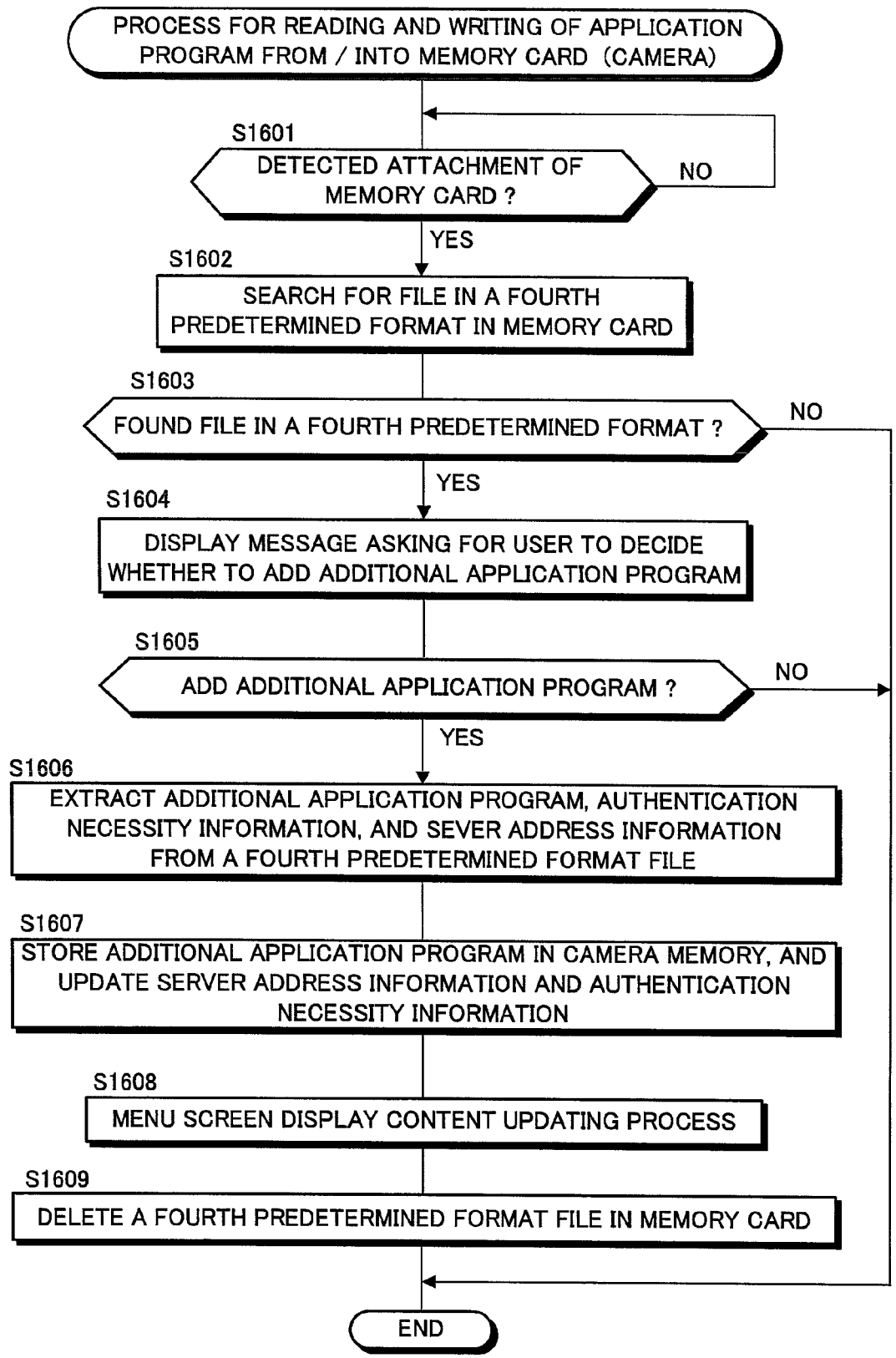
FIG. 16 is a flowchart illustrating a procedure executed by the camera, in which procedure an additional application program in the memory card is retrieved and the retrieved application program is stored in the camera memory together with the server address information and authentication necessity information.

With respect to the procedure for reading the additional application program from the memory card 220 and storing (installing) it in the camera memory 212, which was described above with reference to FIG. 14, depending on the type of the additional application program, an application program requiring the authentication information or an application program requiring the server address information may exist. Therefore, storing procedure is preferably performed in accordance with each application program such that the server address information and authentication necessity information is added when storing the additional application program. FIG. 16 is a flowchart illustrating a procedure for updating the server address information and the authentication necessity information when an additional application program is extracted from the fourth predetermined format file written in the memory card 220 and stored in the camera memory 212.

Similarly to the processing shown in FIG. 14, the processing shown in FIG. 16 is executed by the processing unit 204 when the memory card 220 on which the additional application program file is stored in the fourth predetermined format as a result of the processing performed by the PC 120 in FIGS. 13A and 13B is attached to the electronic camera 200.

In S1601, the processing unit 204 determines whether or not the memory card 220 is attached to the electronic camera 200, and performs the processing of S1601 repeatedly until an affirmative determination is obtained. When the determination of S1601 is affirmative, the processing advances to S1602, in which (the additional application program file). Next, in S1603, the processing unit 204 determines whether or not the fourth predetermined format file is found on the memory card 220. When the determination is negative, the processing of FIG. 16 is terminated, and when the determination is affirmative, the processing advances to S1604.

In S1604, the processing unit 204 displays a message on the display unit 206 asking the user to decide whether or not the additional application program included in the found fourth predetermined format file is to be added to the camera memory 212. In S1605, the processing unit 204 determines whether or not the user wishes to add the additional application program. When the determination is negative, the processing of FIG. 16 is terminated, and when the determination is affirmative, the processing advances to S1606.

In S1606, the processing unit 204 extracts the additional application program and the authentication necessity information and server address information relating to the additional application program from the fourth predetermined format file found on the memory card 220. In S1607, the processing unit 204 stores the additional application program in the camera memory 212 and updates the authentication necessity information and server address information corresponding to the additional application program. The authentication necessity information is stored in the status information 316 in the form of a table from which the necessity of authentication can be determined in relation to the respective application programs 306 stored in the camera memory 212. Further, the server address information 304 is updated as described above to the newest server address information corresponding to the respective application programs stored in the camera memory 212.

In S1608, the processing unit 204 performs menu screen display content update processing. More specifically, the processing unit 204 updates the display content of the menu screen such that the newly added application program can be selected on the menu screen as an application program that can be executed on the PC 120 in addition to pre-existing application programs. In S1609, the processing unit 204 deletes the fourth predetermined format file from the memory card 220.

This invention was described above using the electronic camera 200 and the memory card 220 that can be attached to the electronic camera 200 as an example. The electronic camera 200 may be a still camera or a movie camera. In addition to the electronic camera 200, this invention may be applied to a voice recorder or the like that records a sound as digital data. For example, even when software for reproducing sound data is not installed in the PC, a corresponding application program may be stored on a memory card from the voice recorder such that when the memory card is attached to the PC, software for reproducing sound data is executed automatically and a sound may be reproduced on the PC. Further, by applying this invention to a device capable of measuring the temporal transition of a blood pressure, a pulse rate, a blood oxygen level or the like, measurement results can be checked simply by attaching a memory card removed from the device to a PC without installing special software on the PC in advance.

An embodiment of this invention was described above, but the embodiment merely illustrates an example of an application of the invention, and the technical scope of this invention is not limited to the specific constitutions of the embodiment.

This application claims priority based on Japanese Patent Application 2007-285029, filed with the Japan Patent Office on Nov. 1, 2007, the entire contents of which are incorporated into this application by reference.

INDUSTRIAL APPLICABILITY

This invention may be applied to various devices capable of recording data including image data and sound data, such as an electronic still camera, a movie camera, a voice recorder, a data logger, and a mobile telephone, and a storage medium that can be attached to these devices.

What claimed is:

1. A camera configured to store image data obtained by photographing an object in a detachable storage medium, comprising:
    a device program storage unit in which at least one device program, that can be executed by a different information processing device to the camera, is stored;
        an authentication information storage unit that stores authentication information for authenticating the camera, the authentication information being unique to the camera to which the detachable storage medium is attached and necessary to access a server; and
    an information writing section of a processing unit that writes the device program and the authentication information to the detachable storage medium attached to the camera,
    wherein the information writing section writes a first device program of the at least one device program to the detachable storage medium in a format enabling the different information processing device to read and execute the first device program automatically when the detachable storage medium is attached to the different information processing device, and wherein the first device program causes the different information processing device to read the authentication information and the image data from the detachable storage medium and send the authentication information and the image data to the server.

2. The camera as defined in claim 1, wherein the processing unit further includes a medium connection detection section configured to detect that the detachable storage medium is connected to the camera,
    wherein, when the medium connection detection section detects that the detachable storage medium is attached to the camera, the information writing section reads the first device program from the device program storage unit and writes the read first device program to the detachable storage medium.

3. The camera as defined in claim 1, wherein the processing unit further includes a medium connection detection section configured to detect that the detachable storage medium is connected to the camera,
    wherein, when the medium connection detection section detects that the detachable storage medium is attached to the camera, the information writing section reads the first device program from the device program storage unit, reads the authentication information from the authentication information storage unit, and writes the read first device program and the authentication information to the detachable storage medium.

4. The camera as defined in claim 1, wherein the processing unit further includes a selection section with which one additional device program can be selected as a second device program from the at least one device program stored in the device program storage unit by a user operation,
    wherein the information writing section writes the first device program and the selected second device program to the detachable storage medium, and
    the information writing section writes the device program selected as the second device program to the detachable storage medium in a format whereby the second device program can be loaded and activated by the first device program.

5. The camera as defined in claim 1, wherein the different information processing device performs processing including reading the authentication information from the detachable storage medium storing the first device program, accessing the server configured to provide a service to the different information processing device via a network, and sending the read authentication information to the server as processing performed when the first device program is executed by the different information processing device.

6. The camera as defined in claim 1, wherein the different information processing device performs processing including accessing one of the server and a different server configured to provide a service to the different information processing device via a network, obtaining a new device program from the server, and storing the new device program in the detachable storage medium storing the device program as processing performed when the first device program is executed by the different information processing device.

7. The camera as defined in claim 6, wherein the processing unit further includes a file searching section and a program storage control section,
    wherein processing to write the new device program obtained from the one of the server and the different server, to the detachable storage medium in which the first device program is stored, as an additional file in a format that can be searched by the file searching section is further included as processing performed when the first device program is executed by the different information processing device, the file searching section searches the detachable storage medium attached to the camera for the additional file, and
    the program storage control section performs processing including processing for storing the new device program extracted from the additional file searched by the file searching section in the program storage unit.

8. The camera as defined in claim 1, further comprising an authentication status information storage unit that stores, for each of the first device program and one or more additional device programs stored in the device program storage unit, a property indicating whether or not processing executed by the different information processing device in accordance with the corresponding device program requires the authentication information stored in the authentication information storage unit,
    wherein the information writing section writes the first device program to the detachable storage medium, and when the property corresponding to the first device program written to the detachable storage medium indicates that the processing executed by the different information processing device in accordance with the first device program requires the authentication information, reads the authentication information from the authentication information storage unit and writes the read authentication information to the detachable storage medium.

9. A data transfer method executed by a system including a camera, an information processing device, and a detachable storage medium, comprising:
    storing, in the detachable storage medium attached to the camera, a device program that can be executed by the information processing device, image data generated through image capturing by the camera, and authentication information relating to the camera, the authentication information being unique to the camera to which the detachable storage medium is attached and necessary to access a server, wherein the device program, the image data, and the authentication information are stored in the camera;

detecting attachment of the detachable storage medium when the detachable storage medium is attached to the information processing device;

activating the device program stored in the detachable storage medium attached to the information processing device when attachment of the detachable storage medium is detected; and controlling the information processing device to read the authentication information and the image data from the detachable storage medium attached to the information processing device in accordance with the device program activated, and send the authentication information and the image data to the server.

10. The data transfer method as defined in claim 9, wherein the authentication information is the authentication information for authenticating the camera or a user of the camera, the device program and the authentication information are stored in the detachable storage medium in the storing, and the controlling performed when the device program is executed includes reading the authentication information from the detachable storage medium attached to the information processing device and sending the authentication information to the server via a network, the server configured to provide a service to the information processing device.

11. The data transfer method as defined in claim 10, wherein, in addition to the device program and the authentication information, the image data generated through image capturing by the camera is stored in the detachable storage medium in the storing, and the controlling performed when the device program is executed includes reading the authentication information from the detachable storage medium attached to the information processing device, sending the authentication information to the server via the network, the server configured to provide the service to the information processing device, and having received a response confirming authentication from the server, reading an image from the detachable storage medium attached to the information processing device and sending the read image to the server.

12. The data transfer method as defined in claim 10, wherein the controlling performed when the device program is executed includes reading the authentication information from the detachable storage medium attached to the information processing device, sending the authentication information to the server via the network, the server configured to provide a service to the information processing device, receiving a new device program sent by the server, and storing the received new device program in the detachable storage medium attached to the information processing device, the data transfer method further comprising:

detecting that the detachable storage medium storing the new program is again attached to the camera in the controlling;

searching the detachable storage medium for the new device program stored therein when the detachable storage medium is detected to be again attached to the camera; and storing the new device program in a storage device of the camera when the new device program is found.

13. The data transfer method as defined in claim 9, wherein the device program includes a first program and a second program, in the device program activation, the first program is activated when attachment of the detachable storage medium is detected, and then the second program is activated by the activated first program, and the controlling includes controlling the information processing device in accordance with the second program activated by the first program.

14. A camera configured to store image data obtained by photographing an object in a detachable storage medium comprising:

a device program storage unit in which a first device program and a second device program that can be executed by a different information processing device to the camera are stored;

an authentication information storage unit that stores authentication information for authenticating at least one of the camera and a user of the camera, the authentication information being unique to the camera to which the detachable storage medium is attached and necessary to access a server; and an information writing section of a processing unit that writes the first device program, the second device program and the authentication information to the detachable storage medium attached to the camera, wherein the information writing section writes the first device program to the detachable storage medium in a format enabling the different information processing device to read and execute the first device program automatically when the detachable storage medium is attached to the different information processing device, and wherein the second device program can be loaded and activated by the first program and causes the different information processing device to read the authentication information and the image data from the detachable storage medium and send the authentication information and the image data to the server.

* * * * *